US011214252B2

(12) United States Patent
Xiang et al.

(10) Patent No.: US 11,214,252 B2
(45) Date of Patent: Jan. 4, 2022

(54) VEHICLE CONTROL METHOD AND APPARATUS, VEHICLE, AND STORAGE MEDIUM

(71) Applicant: TENCENT TECHNOLOGY (SHENZHEN) COMPANY LIMITED, Shenzhen (CN)

(72) Inventors: Nan Xiang, Shenzhen (CN); Kuifeng Su, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 330 days.

(21) Appl. No.: 16/589,251

(22) Filed: Oct. 1, 2019

(65) Prior Publication Data
US 2020/0031348 A1 Jan. 30, 2020

Related U.S. Application Data

(63) Continuation of application No. PCT/CN2018/109697, filed on Oct. 10, 2018.

(30) Foreign Application Priority Data

Oct. 19, 2017 (CN) .......................... 201710980290.4

(51) Int. Cl.
*B60T 8/32* (2006.01)
*B60W 30/14* (2006.01)
(Continued)

(52) U.S. Cl.
CPC .......... *B60W 30/143* (2013.01); *B60W 10/04* (2013.01); *B60W 10/18* (2013.01);
(Continued)

(58) Field of Classification Search
CPC .... B60W 30/143; B60W 10/04; B60W 10/18; B60W 2720/10; G05D 1/0223; G05D 2201/0213
See application file for complete search history.

(56) References Cited

U.S. PATENT DOCUMENTS 9,452,755 B2    9/2016   Kastner et al.
10,935,982 B2 *  3/2021  Yao ..................... B60W 30/095
(Continued)

FOREIGN PATENT DOCUMENTS

CN    105711441    6/2016
CN    105818686    8/2016
(Continued)

OTHER PUBLICATIONS

Supplementary European Search Report Issued in Application No. 18869117.4-1012/ Patent No. 3614224, PCT/CN2018/109697 dated Jan. 14, 2021, (10 pages).
(Continued)

*Primary Examiner* — Adam M Alharbi
(74) *Attorney, Agent, or Firm* — Oblon, McClelland, Maier & Neustadt, L.L.P.

(57) ABSTRACT

A vehicle control method is provided. In the method, a target driving speed and an actual driving speed of the vehicle are obtained. A control mode among candidate control modes is determined by the processing circuitry based on a comparison between the target driving speed and the actual driving speed. The candidate control modes includes a braking control mode, an acceleration control mode, and a stopping control mode. A throttle amount and a braking amount to change the actual driving speed to the target driving speed are determined by the processing circuitry. Further, the determined throttle amount and braking amount are applied to the vehicle based on the determined control mode.

20 Claims, 12 Drawing Sheets

(51) Int. Cl.
   *B60W 10/04*   (2006.01)
   *B60W 10/18*   (2012.01)
   *G05D 1/02*    (2020.01)

(52) U.S. Cl.
   CPC ....... *G05D 1/0223* (2013.01); *B60W 2720/10* (2013.01); *G05D 2201/0213* (2013.01)

(56) References Cited

U.S. PATENT DOCUMENTS

| | | |
|---|---|---|
| 2006/0022469 A1 | 2/2006 | Syed et al. |
| 2013/0151090 A1 | 6/2013 | Chae et al. |
| 2015/0142292 A1 | 5/2015 | Kastner et al. |
| 2017/0043767 A1 | 2/2017 | Khafagy et al. |
| 2017/0274905 A1 | 9/2017 | Sugawara et al. |
| 2017/0297566 A1* | 10/2017 | Matsumura ............ B60K 28/06 |

FOREIGN PATENT DOCUMENTS

| | | |
|---|---|---|
| CN | 106904098 | 6/2017 |
| CN | 107215334 | 9/2017 |
| CN | 108287540 | 7/2018 |
| DE | 102 29 036 A1 | 1/2004 |
| DE | 10 2007 036794 A1 | 2/2009 |
| EP | 2 517 936 A2 | 10/2012 |
| FR | 2 770 016 A1 | 4/1999 |
| JP | 5897126 | 3/2016 |
| WO | WO2008/149199 A2 | 12/2008 |
| WO | WO2013/110758 A1 | 8/2013 |

OTHER PUBLICATIONS

International Search Report dated Dec. 28, 2018 in PCT/CN2018/109697 filed Oct. 10, 2018. (With English Translation).
Written Opinion dated Dec. 28, 2018 in PCT/CN2018/109697 filed Oct. 10, 2018.
Office Action dated Apr. 24, 2019 in Chinese Patent Application No. 201710980290.4 (with concise English Translation).
Office Action dated Aug. 13, 2019 in Chinese Patent Application No. 201710980290.4 (with concise English Translation).

* cited by examiner

VEHICLE CONTROL METHOD AND APPARATUS, VEHICLE, AND STORAGE MEDIUM

RELATED APPLICATION

This application is a continuation of International Application No. PCT/CN2018/109697, filed on Oct. 10, 2018, which claims priority to Chinese Patent Application No. 201710980290.4, filed on Oct. 19, 2017, and entitled "VEHICLE CONTROL METHOD AND APPARATUS, VEHICLE, AND STORAGE MEDIUM". The entire disclosures of the prior applications are hereby incorporated by reference in their entirety.

FIELD OF THE TECHNOLOGY

This application relates to communications technologies.

BACKGROUND OF THE DISCLOSURE

A self-driving car driven by an internal combustion engine or a motor is usually controlled by using a throttle, a transmission structure, a braking structure, and an electronic stability program (ESP) system. In the self-driving car, stability of a driving speed of the car affects user experience. How to control the driving speed of the car smoothly is receiving increasingly more attention.

SUMMARY

Embodiments of this application provide a vehicle control method and apparatus, a vehicle, and a non-transitory computer-readable storage medium, which can implement smooth speed control of an autonomous vehicle (e.g., a self-driving car).

Technical solutions of the embodiments of this application are implemented as follows:

An embodiment of this application provides a vehicle control method, for example performed by a vehicle terminal or a vehicle. In the method a target driving speed and an actual driving speed of the vehicle are obtained by processing circuitry. A control mode among candidate control modes is determined by the processing circuitry based on a comparison between the target driving speed and the actual driving speed. The candidate control modes include a braking control mode, an acceleration control mode, and a stopping control mode. A throttle amount and a braking amount to change the actual driving speed to the target driving speed are determined by the processing circuitry. The determined throttle amount and braking amount are applied by the processing circuitry to the vehicle based on the determined control mode.

According to an embodiment, the obtaining includes applying a speed-time curve to a road section from an actual location of the vehicle to a target location, to obtain time and speeds corresponding to arrival at different locations in the road section that are in front of the vehicle. The obtaining further includes determining a speed corresponding to a front location of the different locations that is adjacent to the actual location as the target driving speed.

According to an embodiment, the applying includes reducing, based on a predetermined amplitude, the braking amount applied to the vehicle, in a case that the control mode is the acceleration control mode. The applying further includes applying the throttle amount for a target acceleration corresponding to the control mode in the vehicle until the actual driving speed is increased to the target driving speed, in a case that the applied braking amount is reduced to a minimum braking amount.

According to an embodiment, the applying includes reducing, based on a predetermined amplitude, the throttle amount applied to the vehicle, in a case that the control mode is the braking control mode. The applying further includes applying the braking amount for a target deceleration corresponding to the control mode in the vehicle until the actual driving speed is reduced to the target driving speed, in a case that the applied throttle amount is reduced to a minimum throttle amount.

According to an embodiment, the applying includes applying a first braking amount for a target deceleration corresponding to the control mode in the vehicle, in a case that the control mode is the stopping control mode. The applying further includes applying a second braking amount for maintaining the vehicle in a stopping state, in a case that the speed is reduced to zero.

According to an embodiment, the applying includes applying, to the vehicle, a control parameter to be applied to the vehicle, to obtain an actual acceleration, and integrating a difference between the actual acceleration and a target acceleration obtained according to the control mode, to obtain a corrected value of the control parameter applied to the vehicle. The applying further includes updating, based on the corrected value, the control parameter applied to the vehicle, the control parameter being an updated throttle amount or an updated braking amount.

According to an embodiment, the determining the throttle amount includes determining a target acceleration to reach the target driving speed in a road section where the vehicle is located, in a case that the control mode is the acceleration control mode. The determining includes determining, based on a first linear relationship between throttle amounts and accelerations of the vehicle, a first throttle amount for the target acceleration in the road section where the vehicle is located. The determining includes determining, based on a second linear relationship between resistance offsets of the vehicle and required throttle amounts, a second throttle amount for offsetting a resistance during movement of the vehicle. The determining further includes determining a sum of the first throttle amount and the second throttle amount as the throttle amount.

According to an embodiment, the first linear relationship includes at least two successively connected linear relationships corresponding to different gears of the vehicle. Further, the determining the first throttle amount includes determining target gears to be used in sequence to implement the target acceleration, and determining, based on the linear relationships in the first linear relationship that correspond to the target gears, the first throttle amount for each of the target gears.

According to an embodiment, the determining the braking amount includes determining, based on a third linear relationship between resistances and minimum braking amounts required for a moment balance state as well as a resistance that the vehicle encounters during driving, a minimum braking amount to maintain the moment balance of the vehicle. Further, the braking amount is determined to be equal to the minimum braking amount in a case that the control mode is the acceleration control mode.

According to an embodiment, the determining the braking amount includes determining a target deceleration to reach the target driving speed in a road section where the vehicle is located, in a case that the control mode is the braking control mode. The determining includes determining, based on a fourth linear relationship between braking amounts and accelerations of the vehicle, a first braking amount required for the target deceleration in the road section where the vehicle is located. The method includes determining, based on a fifth linear relationship between resistances and braking amounts equivalent to the resistances, a second braking amount equivalent to a resistance that the vehicle encounters during driving. Further, the determining includes determining a difference between the first braking amount and the second braking amount as the braking amount.

According to an embodiment, a fourth linear relationship in which a starting speed matches the actual driving speed of the vehicle is determined by the processing circuitry among candidate fourth linear relationships. Each of the candidate fourth linear relationships corresponds to a different starting speed, and decelerations obtained through the same braking amount are correlated to the different starting speeds of the corresponding fourth linear relationships.

According to an embodiment, the determining the throttle amount includes determining, based on a sixth linear relationship between resistances and minimum throttle amounts required for maintaining idling as well as a resistance encountered during driving, a minimum throttle amount to maintain the vehicle idling, and the minimum throttle amount as the throttle amount in a case that the control mode is the braking control mode.

An embodiment of this application further provides a vehicle control apparatus, including:

an obtaining unit, configured to obtain a target driving speed and an actual driving speed of a vehicle;

a control mode determining unit, configured to determine, based on a comparison result of the target driving speed and the actual driving speed, a control mode corresponding to the comparison result among candidate control modes, the candidate control modes including: a braking control mode, an acceleration control mode, and a stopping control mode;

a control parameter determining unit, configured to determine, based on a throttle amount and braking amount determining manner corresponding to the determined control mode, a throttle amount and a braking amount required for implementing the target driving speed; and an application unit, configured to apply the determined throttle amount and braking amount in the vehicle based on a throttle amount and braking amount application manner corresponding to the determined control mode.

An embodiment of this application further provides a vehicle, including:

a memory, configured to store an executable program; and a processor, configured to implement the vehicle control method in the claims by performing the executable program stored in the memory.

An embodiment of this application further provides a storage medium, where the storage medium stores an executable program, and the executable program, when executed by a processor, implements steps of the foregoing method.

BRIEF DESCRIPTION OF THE DRAWINGS

FIG. 1-2 is another schematic diagram of a vehicle terminal fixed in a vehicle according to an embodiment of this application;

FIG. 2 is a schematic diagram of a software and hardware structure of a vehicle terminal according to an embodiment of this application;

FIG. 4-1 is a schematic architectural diagram of a vehicle control method according to an embodiment of this application;

FIG. 4-2 is a schematic architectural diagram of vehicle control according to an embodiment of this application;

FIG. 4-3 is a schematic architectural diagram of vehicle control according to an embodiment of this application;

FIG. 9-1 is a schematic diagram of a linear relationship between braking amounts and accelerations according to an embodiment of this application;

FIG. 9-2 is a schematic diagram of a linear relationship between braking amounts and accelerations according to an embodiment of this application;

DESCRIPTION OF EMBODIMENTS

Figure 1:
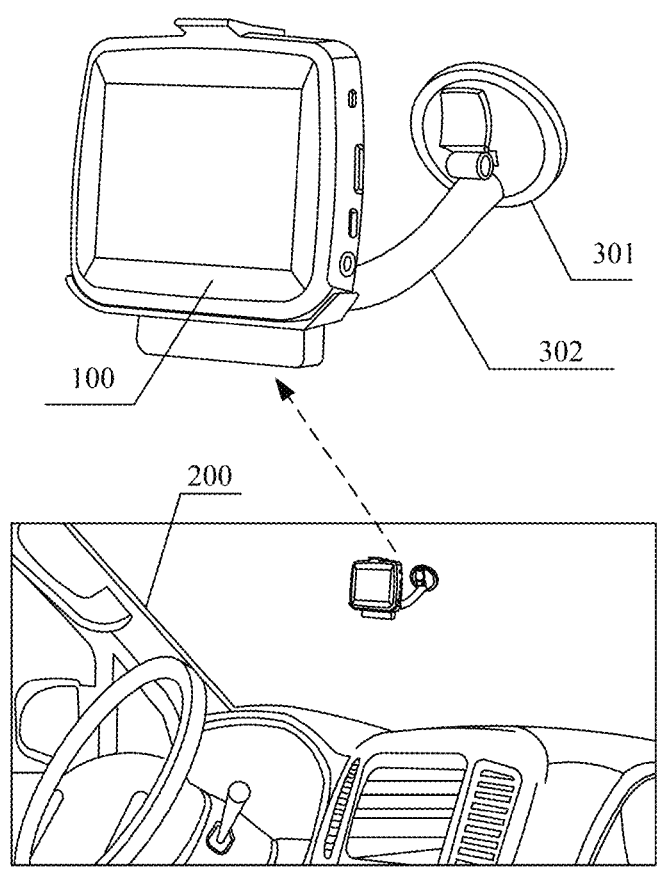
FIG. 1-1 is a schematic diagram of a vehicle terminal fixed in a vehicle according to an embodiment of this application.

This application is described in further detail below with reference to the accompanying drawings and embodiments. The specific embodiments described herein are merely used for illustrating this application, and are not intended to limit this application.

Before this application is described in further detail, nouns and terms involved in the embodiments of this application are described. The nouns and terms involved in the embodiments of this application apply to the following explanations.

1) Vehicle: a vehicle is, for example, a self-driving transportation means that can run on roads. For example, a driverless car driven by an internal combustion engine or a driverless car driven by a motor.

2) Target driving speed: a target driving speed is, for example, a speed that needs to be implemented when the vehicle passes through a front location in a road section that is planned according to an actual location and a target location during an autonomous driving process of the vehicle.

3) Actual driving speed: an actual driving speed is, for example, a driving speed measured in real time in various manners, such as a sensor or satellite positioning, during the autonomous driving process of the vehicle.

4) Control parameter: a control parameter is, for example, a parameter used for controlling the vehicle to implement the target driving speed, and at least includes a throttle amount and a braking amount.

5) Control mode: a control mode is, for example, a mode applied in the vehicle to implement the target driving speed during the autonomous driving process of the vehicle. In different control modes, the control parameter is applied in the vehicle in different manners. This specification relates to the following exemplary types of control modes:

5.1) Acceleration control mode: an acceleration control mode is, for example, a mode in which the vehicle is controlled to accelerate to the target driving speed by using a throttle amount as a control parameter, or may be a mode in which the vehicle is controlled to accelerate to the target driving speed by using a throttle amount and a braking amount as control parameters.

5.2) Braking control mode: a braking control mode is, for example, a control mode in which the vehicle is controlled to decelerate to the target driving speed by using a braking amount as a control parameter.

5.3) Stopping control mode: a stopping control mode is, for example, a control mode in which the vehicle is controlled to decelerate to zero speed by using a braking amount as a control parameter.

6) Control model: a control model, for example, represents a control parameter applied in the vehicle to implement the target driving speed and a manner of applying the control parameter, and corresponds to the foregoing control mode.

Control models used in the acceleration control mode include the following exemplary types:

6.1) Power system model: a power system model is used in the acceleration control mode to determine a throttle amount that needs to be applied to the vehicle to increase the speed to the target driving speed. According to performance of components (including, for example, an internal combustion engine, a clutch, a gearbox, a differential, a throttle valve, and a throttle opening) of a power system of the vehicle, the model represents a linear relationship between different given throttle amounts of the vehicle and accelerations that the vehicle can be driven to implement (where the accelerations are positive values).

In an example, the power system model may be merely a linear relationship, or may have a piecewise attribute according to different gears of the vehicle, that is, the power system model includes successively connected linear relationships corresponding to different gears.

6.2) First damping factor model: a first damping factor model represents, according to resistance factors (including, for example, a wind resistance, a mechanical friction resistance of the vehicle, and a road resistance), a linear relationship between different resistances in a vehicle driving process and throttle amounts required for controlling the vehicle to keep idling (e.g., the engine or motor has no load) in the acceleration control mode.

6.3) Second damping factor model: a second damping factor model represents, according to resistance factors, a linear relationship between different resistances that the vehicle encounters during driving and minimum braking amounts for keeping a moment balance of the vehicle in the acceleration control mode.

Control models used in the braking control mode include the following exemplary types:

6.4) Braking system model: a braking system model is used in the braking control mode to determine a braking amount that needs to be applied to the vehicle to reduce the speed to the target driving speed. According to performance of components (including, for example, a brake pedal, a brake assist system, a brake hydraulic circuit, a brake pad, and a brake disc) of a brake system of the vehicle, the model represents a linear relationship between different given braking amounts of the vehicle and accelerations that the vehicle can implement (where the accelerations are negative values, and is also referred to as decelerations herein).

6.5) Third damping factor model: a third damping factor model represents, according to resistance factors (including, for example, a wind resistance, a mechanical friction resistance of the vehicle, and a road resistance), a linear relationship between different resistances that the vehicle encounters during actual driving and equivalent braking amounts in the braking control mode.

6.6) Fourth damping factor model: a fourth damping factor model represents, according to the resistance factors, a relationship between different resistances that the vehicle encounters during driving and minimum throttle amounts for keeping the moment balance of the vehicle in the braking control mode.

7) Throttle amount: a throttle amount corresponds to an engine oil supply for a vehicle driven by an internal combustion engine, and corresponds to a motor power supply for a vehicle driven by power.

In some examples, during control over a self-driving car (or autonomous vehicle), a throttle controller obtains a corresponding throttle control amount according to a difference between a target driving speed and an actual driving speed and according to an algorithm of the throttle controller. A brake controller obtains a corresponding brake control amount according to the speed difference between the target driving speed and the actual driving speed and according to an algorithm of the brake controller. According to the obtained throttle control amount, brake control amount, and speed difference, the vehicle is controlled by using a throttle alone or controlled by using a brake alone. The vehicle is controlled by using the throttle amount or the braking amount alone. Therefore, if the vehicle is controlled by using the throttle alone, the brake control is in a released state, and a vehicle component for the brake control is in a zero initial state. If the vehicle is controlled by using the brake alone, the throttle control is in a released state, and a vehicle component for the throttle control is in a zero initial state. Thus, frequent switching between the brake and the throttle easily causes vehicle vibrations. Moreover, such a method has disadvantages of poor smoothness in speed control and high control difficulty, which are embodied as vibrations during vehicle acceleration and stalling during vehicle deceleration. Moreover, in this example, when stability of the vehicle is controlled by using an ESP system, the vehicle is not only required to have a higher electronic configuration, such as a steering sensor, a wheel sensor, a sideslip sensor, a transverse acceleration sensor, and other devices, but also required to have a lower wind resistance coefficient and stronger power performance, resulting in high implementation costs and low transportability of a self-driving car driven by an internal combustion engine, and further affecting the promotion and application of the self-driving car driven by the internal combustion engine.

In some examples, according to the target driving speed and the actual driving speed, the vehicle is controlled by using the throttle amount alone or by using the braking amount alone, so as to track the target speed. In this example, the self-driving car control solution is not generally applicable to all self-driving cars and has poor smoothness in speed control over the self-driving car.

In view of the foregoing problem, in embodiments of this application, control models for controlling autonomous driving (or control) of the vehicle are proposed. According to a relationship between the target driving speed and the actual driving speed, a control mode matching the relationship is determined. Based on a control model corresponding to the matching control mode, a throttle amount and a braking amount required for controlling the vehicle are determined. When the vehicle is controlled based on the two control parameters at the same time, that is, the throttle amount and the braking amount, vehicle vibrations generated due to frequent switching between the brake and the throttle can be avoided, thus improving the smoothness of speed control.

A vehicle control apparatus for implementing embodiments of this application is described first.

For implementation of the vehicle control apparatus, in this embodiment of this application, the vehicle control apparatus may be implemented on a vehicle terminal side, implemented on a vehicle side, or implemented on an electronic device side (e.g., a server) communicating with the vehicle. A corresponding storage medium may be disposed on the vehicle terminal side, the vehicle side, or the electronic device side, to correspondingly complete processing on the vehicle terminal side, the vehicle side, or the electronic device side.

In an example, a vehicle terminal for implementing the vehicle control method according to embodiments of this application is described below with reference to the accompanying drawings.

The vehicle terminal described in the embodiments of this application may be implemented in a form of a mobile terminal (e.g., a smartphone and a tablet computer), an event data recorder, a navigator, or the like, and is fixed at any position on the vehicle (e.g., on window glass or a bridge of the vehicle) through a fixing device. The fixing device may be flexibly disposed at any position in the internal space of the vehicle as required by means of suction based on a vacuum chuck, suction based on a magnetic element, fastening based on a bolt and a nut, engagement based on a clip, and binding based on a strap. The vehicle control apparatus described in the following embodiments of this application may also be embedded into the vehicle to avoid occupying extra space.

In an example of an implementation form of the vehicle control apparatus, in the schematic diagram of a vehicle terminal fixed in a vehicle shown in FIG. 1-1, a vehicle terminal 100 is fixed on a front window of a vehicle 200 through a fixing device (e.g., including a chuck 301 and a support arm 302) by means of the chuck. The height of the vehicle terminal 100 may be adjusted by adjusting the support arm 302 in the fixing device, so that a user can view a screen of the vehicle terminal 100 conveniently. In another example of a mobile terminal disposed in the vehicle, in another schematic diagram of a vehicle terminal fixed in the vehicle shown in FIG. 1-2, the vehicle terminal 100 is embedded into a front panel of the vehicle 200 and forms a streamlined entirety with the internal structure of the vehicle 200, to save internal space of the vehicle 200.

Figures 1, 2:
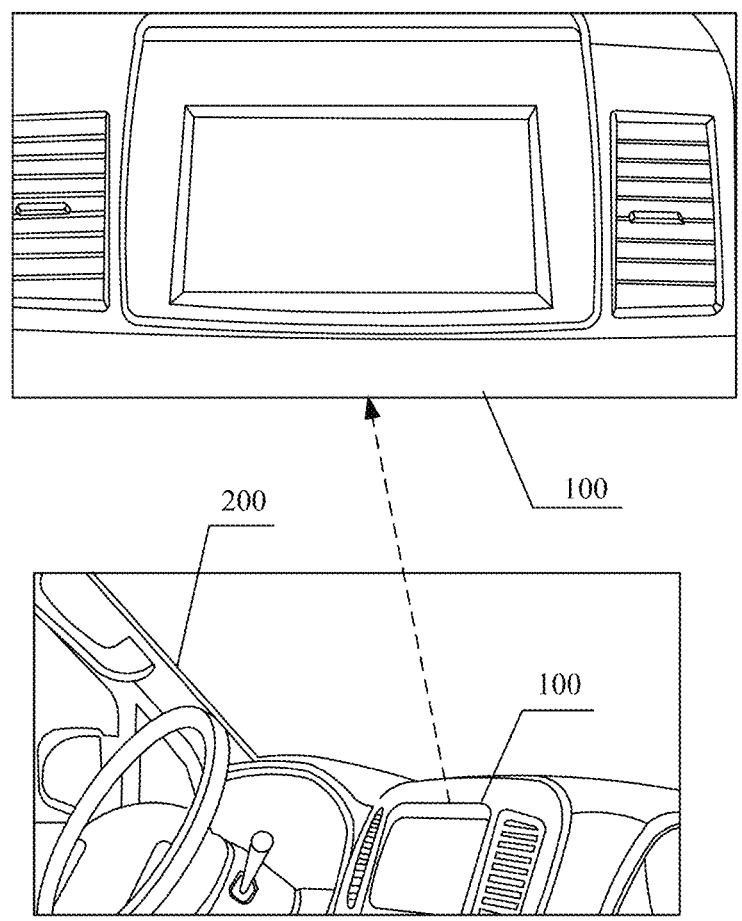
Figure 2:
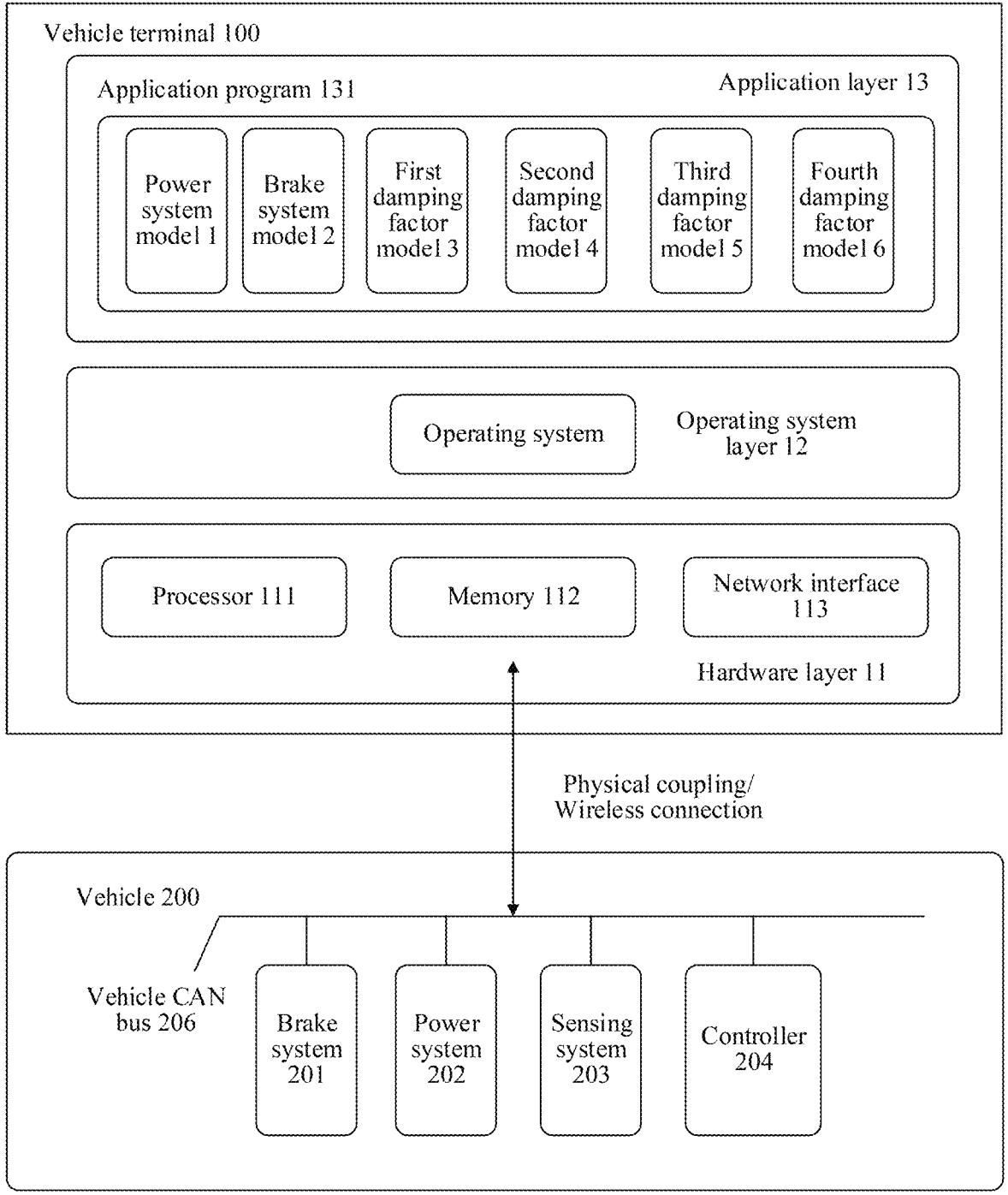

FIG. 2 is an exemplary schematic diagram of a software and hardware structure of the vehicle terminal 100 that includes a hardware layer 11, an operating system layer 12, and an application layer 13, which are described separately.

The hardware layer 11 includes the following structures:

A memory 112 may be provided as various forms of non-volatile memories, for example, a read-only memory (ROM), a programmable read-only memory (PROM), or an erasable programmable read-only memory (EPROM), and is configured to store various types of data. Examples of such data include: any computer program to be operated on the vehicle terminal 100. An executable program corresponding to the vehicle control method according to the embodiment of this application may be stored in the memory 112 in advance.

A processor 111 may be an integrated circuit chip and has a signal processing capability. In an implementation process, steps of the vehicle control method according to the embodiment of this application may be completed by using a hardware integrated logic circuit or software-form instructions in the processor 111. The processor 111 may be processing circuitry such as a general-purpose processor, a digital signal processor (DSP), or another programmable logic device, a discrete gate or a transistor logic device, a discrete hardware component, or the like.

A network interface 113 is configured to communicate with other devices (e.g., a vehicle 200) in a wired or wireless manner. The network interface 113 may access wireless networks based on communications standards, for example, WiFi, 2G, 3G, 4G, and evolved 4G or a combination thereof.

An operating system layer 12 includes various system programs, for example, a framework layer, a core library layer, and a driving layer, and is configured to implement various basic services and process tasks that are based on the hardware layer 11. This embodiment of this application does not exclude use of any type of operating system, which may include an operating system based on a Linux kernel, such as an Android system, and may also include an iOS system and a quasi-Unix system.

An application layer 13 includes an application program 131. The application program 131 is correspondingly installed in a client on the vehicle terminal 100, and includes a program for implementing the vehicle control method according to the embodiment of this application. The program for implementing the vehicle control method according to the embodiment of this application includes: a power system model 1, a braking system model 2, a first damping factor model 3, a second damping factor model 4, a third damping factor model 5, and a fourth damping factor model 6.

The operation of obtaining, by the vehicle terminal 100, driving parameters of the vehicle 200 (e.g., an actual driving speed, a target driving speed, an acceleration, and/or a vehicle posture) are described in the following. Referring to FIG. 2, the vehicle 200 includes at least the following components: a brake system 201, a power system 202, and a sensing system 203. The brake system 201 and the power system 202 are controlled by a controller 204 (e.g., control circuitry) in the vehicle 200 based on data obtained from a vehicle CAN bus 206. Data obtained by the sensing system 203 is sent to the vehicle terminal 100 by the controller 204 based on the vehicle CAN bus 206.

The vehicle terminal 100 is connected to the vehicle CAN bus 206 of the vehicle 200. The vehicle terminal 100 that is disposed in the vehicle 200 based on the manner shown in FIG. 1-1 may be connected to the vehicle CAN bus 206 by means of wireless communication such as short distance communication. For the vehicle terminal 100 that is disposed in the vehicle 200 based on the manner shown in FIG. 1-2, a bus in the vehicle terminal 100 may be physically coupled to a vehicle CAN bus 206 to support the processor 111 to read data from the vehicle CAN bus 206. The processor 111 in the vehicle terminal 100 reads various data of the vehicle 200 through the vehicle CAN bus 206 in the vehicle 200, to obtain states of various components in the vehicle 200. For example, an actual driving speed, a vehicle posture, and the like of the vehicle 200 may be obtained based on data outputted from a sensor, for example of the sensing system 203.

In an example, a vehicle for implementing the vehicle control method according to an embodiment of this application is described below with reference to the accompanying drawings.

Figure 3:
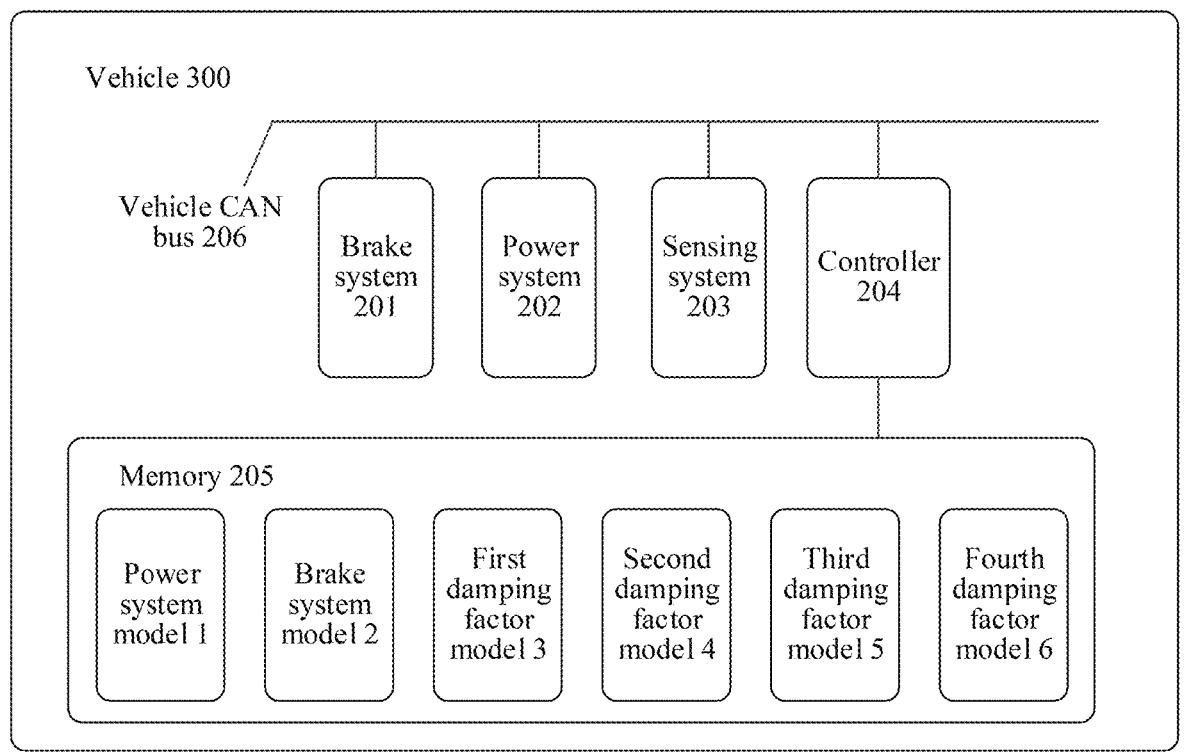
FIG. 3 is a schematic diagram of a vehicle terminal according to an embodiment of this application.

FIG. 3 is a schematic diagram of a vehicle 300. The vehicle 300 includes at least the following components: a brake system 201, a power system 202, a sensing system 203, and a controller 204. Data obtained by the sensing system 203 is sent to the controller 204 through a vehicle CAN bus 206. The controller 204 operates, based on the obtained data, a program running on the memory 205, and applies obtained processing data to the vehicle 300, to control the brake system 201 and the power system 202 of the vehicle 300. In this embodiment of this application, a power system model 1, a braking system model 2, a first damping factor model 3, a second damping factor model 4, a third damping factor model 5, and a fourth damping factor model 6 are stored in the memory 205.

Figures 1, 4:
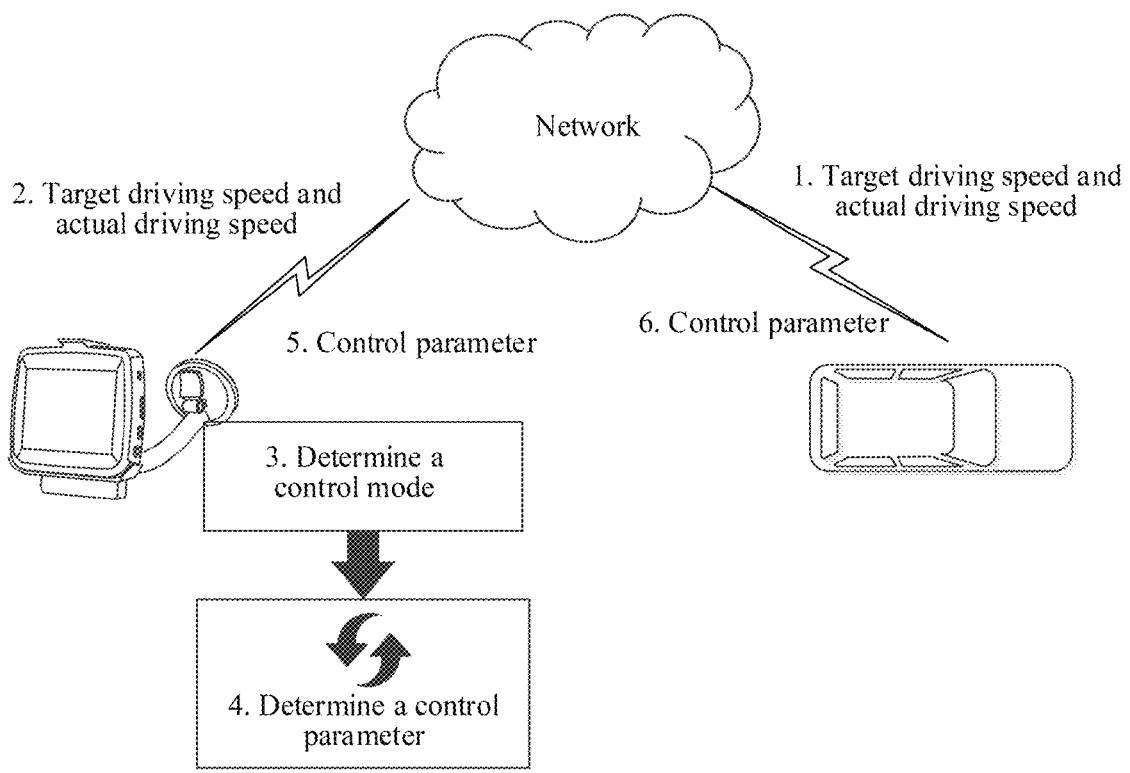
Figures 2, 4:
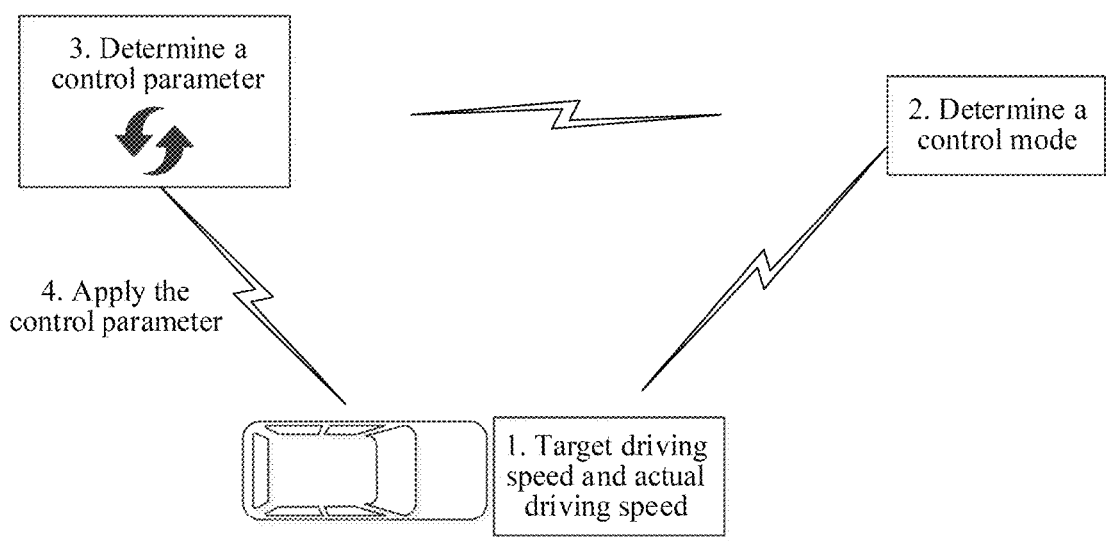
Figures 3, 4:
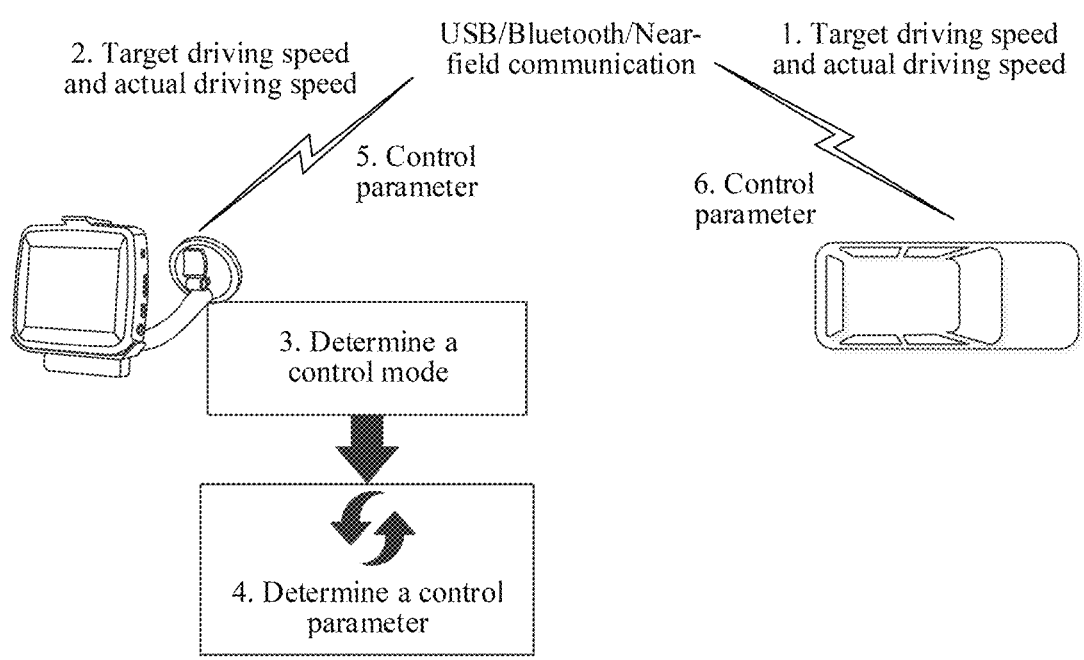

In an example, the vehicle control apparatus is implemented on a vehicle terminal side and a vehicle side. FIG. 4-1 is a schematic architectural diagram of a vehicle control method according to an embodiment of this application. A vehicle terminal stores an application program for implementing vehicle control. For the application program stored in the vehicle terminal, refer to the application program stored in the application layer of the vehicle terminal 100 shown in FIG. 2. The vehicle terminal obtains a target driving speed and an actual driving speed of the vehicle through a network server; determines, based on a comparison result of the target driving speed and the actual driving speed, a control mode corresponding to the comparison result among candidate braking control mode, acceleration control mode and stopping control mode; and determines, based on a throttle amount and braking amount determining manner corresponding to the control mode, a throttle amount and a braking amount required for implementing the target driving speed. Based on a throttle amount and braking amount application manner corresponding to the control mode, the network server controls autonomous driving of the vehicle according to the throttle amount and the braking amount.

In another example, the vehicle control apparatus is implemented on a vehicle side. FIG. 4-2 is a schematic architectural diagram of vehicle control according to an embodiment of this application. An application program for implementing vehicle control is stored in a vehicle. For the application program stored in the vehicle, refer to the application program stored in the memory 205 of the vehicle 300 shown in FIG. 3. The vehicle obtains a target driving speed and an actual driving speed of the vehicle; determines, by using the stored application program and based on a comparison result of the target driving speed and the actual driving speed, a control mode corresponding to the comparison result among candidate braking control mode, acceleration control mode, and stopping control mode; determines, based on a throttle amount and braking amount determining manner corresponding to the control mode, a throttle amount and a braking amount required for implementing the target driving speed; and applying the determined throttle amount and braking amount in the vehicle based on the throttle amount and braking amount application manner corresponding to the control mode, so that the vehicle drives autonomously based on the throttle amount and the braking amount.

In a further example, FIG. 4-3 is a schematic architectural diagram of a vehicle control method according to an embodiment of this application. An application program for implementing vehicle control is stored in a vehicle terminal. For the application program stored in the vehicle terminal, refer to the application program stored in the application layer of the vehicle terminal 100 shown in FIG. 2. The vehicle terminal obtains a target driving speed and an actual driving speed of the vehicle from the vehicle by means of wireless communication, such as Bluetooth, near-field communication, and a universal serial bus (USB); determines, based on a comparison result of the target driving speed and the actual driving speed, a control mode corresponding to the comparison result among candidate braking control mode, acceleration control mode, and stopping control mode; and determines, based on a throttle amount and braking amount determining manner corresponding to the control mode, a throttle amount and a braking amount required for implementing the target driving speed. The vehicle terminal controls autonomous driving of the vehicle based on the determined throttle amount and braking amount by means of wireless communication.

So far, the vehicle control apparatus (e.g., the vehicle terminal or vehicle) in the embodiments of this application has been described based on functions thereof. A vehicle control solution provided in the embodiments of this application is further described based on the schematic diagram of a functional structure of a vehicle terminal shown in FIG. 2 and a vehicle structure shown in FIG. 3.

Figure 5:
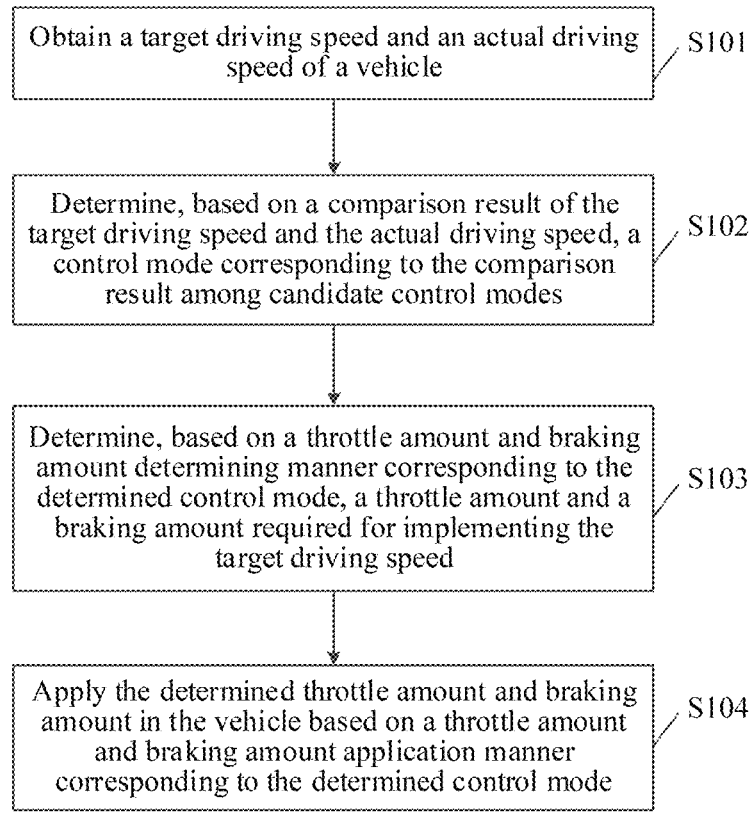
FIG. 5 is a schematic flowchart of a vehicle control method according to an embodiment of this application.

The vehicle control solution provided in the embodiments of this application is described below with reference to the schematic architectural diagrams of vehicle control shown in FIG. 4-1, FIG. 4-2, and FIG. 4-3. FIG. 5 is a schematic flowchart of a vehicle control method according to an embodiment of this application, which is described based on the following steps.

In step S101, a target driving speed and an actual driving speed of a vehicle is obtained.

Figure 6:
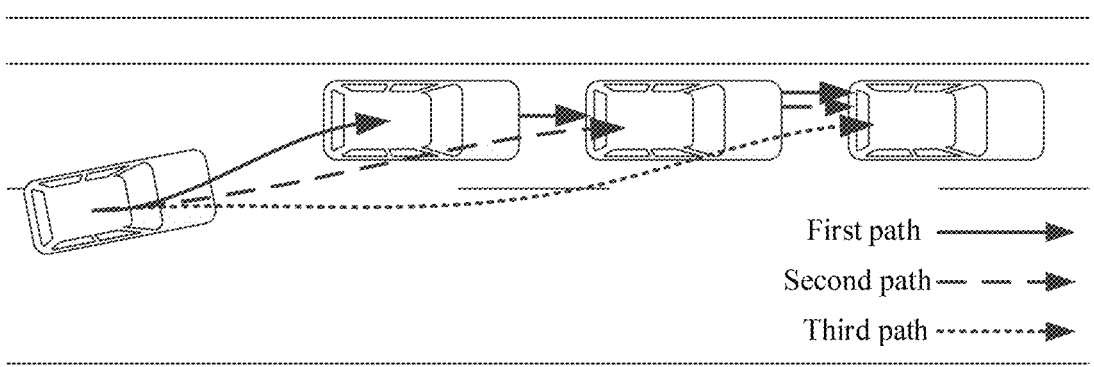
FIG. 6 is a schematic diagram of tracks for autonomous driving according to an embodiment of this application.

A road section is obtained based on a route planning algorithm of autonomous driving. Based on a road section from an actual location of the vehicle to a target location, a speed-time curve (e.g., an acceleration curve) is applied, to obtain time and speeds corresponding to arrival at different front locations in the road section. A track from the current location to a nearest sampling point in front in the route is a road section where the vehicle is currently located. Referring to FIG. 6, FIG. 6 is a schematic diagram of tracks for vehicle autonomous driving according to an embodiment of this application. FIG. 6 shows different tracks for vehicle autonomous driving. The tracks are filtered according to multiple factors such as dynamic constraints and obstacle avoidance. An optimal track to the target location is selected with reference to factors such as safety, comfort, and time. In the optimal track, a speed corresponding to a front location adjacent to the actual location of the vehicle is the target driving speed.

In an embodiment, sampling data, such as an actual driving speed, acceleration, and a vehicle posture, of the vehicle in the road section is acquired by using sensors disposed in the vehicle, for example, a speed sensor, an acceleration sensor, and a vehicle body sensor. The acquired sampling data is filtered, to remove obvious incorrect data such as noise, so as to obtain actual running parameters of the vehicle in the road section, including an actual driving speed, an actual acceleration, and the like. The actual driving speed of the vehicle can be measured in real time by means of satellite positioning, or the like.

In step S102, a control mode corresponding to the comparison result among candidate control modes is determined based on a comparison result of the target driving speed and the actual driving speed.

In an embodiment, the candidate control modes include an acceleration control mode, a braking control mode, and a stopping control mode. Based on the comparison result of the target driving speed and the actual driving speed, a control mode corresponding to the comparison result can be determined among the three candidate control modes.

When the target driving speed of the vehicle is greater than the actual driving speed of the vehicle in the road section, it is determined that autonomous driving control is performed on the vehicle based on the acceleration control mode that implements the target driving speed by increasing a throttle amount. The acceleration control mode may be a method for making the actual driving speed equal to the target driving speed by using the throttle amount as the only control factor. The acceleration control mode may also be a method for making the actual driving speed equal to the target driving speed by using multiple control factors such as a throttle amount and a braking amount, where the throttle amount is a control factor with the highest weight among the multiple control factors.

When the target driving speed of the vehicle is less than the actual driving speed of the vehicle in the road section, it is determined that autonomous driving control is performed on the vehicle based on the braking control mode that implements the target driving speed by increasing a braking amount. The braking control mode may be method for making the actual driving speed equal to the target driving speed by using the braking amount as the only control factor. The braking control mode may also be a method for making the actual driving speed equal to the target driving speed by using multiple control factors such as a throttle amount and a braking amount, where the braking amount is a control factor with the highest weight among the multiple control factors.

When the target driving speed of the vehicle is zero and the actual driving speed of the vehicle is not zero, it is determined that autonomous driving control is performed on the vehicle based on the stopping control mode that implements stopping by using a braking amount.

In this embodiment, a control mode of the vehicle can be determined quickly by comparing the target driving speed with the actual driving speed. Compared with the related technology in which a vehicle control mode is determined comprehensively according to a throttle control amount, a brake control amount, and a speed difference, the implementation process in this embodiment is simpler.

In step S103, a throttle amount and a braking amount required for implementing the target driving speed are determined based on a throttle amount and braking amount determining manner corresponding to the determined control mode.

When the matching control mode is the acceleration control mode, in an embodiment, a target acceleration required for implementing the target driving speed in the road section where the vehicle is located is determined first. By using the determined target acceleration, it can be implemented that the actual driving speed is equal to the target driving speed when the vehicle reaches the end of the road section. By using the determined target acceleration, it is also possible to implement that the actual driving speed is equal to the target driving speed before the vehicle reaches the end of the road section, and the vehicle runs at the target driving speed constantly before reaching the end of the road section. Then, based on a power system model that represents a relationship between given throttle amounts of the vehicle and accelerations implemented by the vehicle, a first throttle amount required for implementing the target acceleration in the road section is determined, and the first throttle amount is used as a control parameter of the vehicle.

Figure 7:
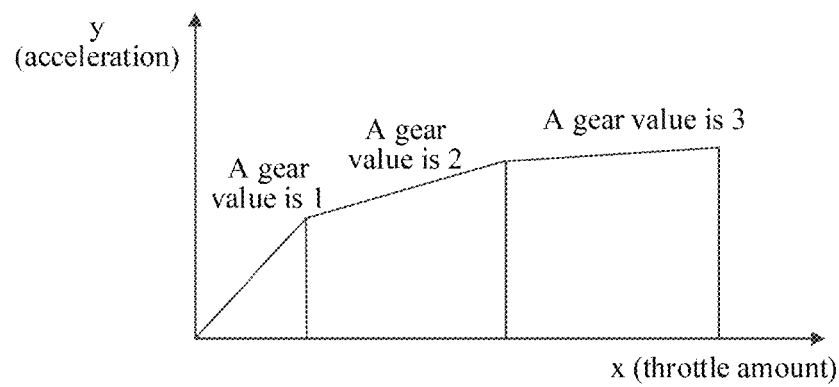
FIG. 7 is a schematic diagram of a linear relationship between throttle amounts and accelerations according to an embodiment of this application.

In this embodiment of this application, the power system model is a linear relationship between given throttle amounts and different accelerations that the vehicle can be driven to implement, where the relationship is obtained according to performance of components (including, for example, an internal combustion engine, a clutch, a gearbox, a differential, a throttle valve, and a throttle opening) of a power system of the vehicle. By simplifying a nonlinear relationship between various components in the power system of the vehicle into a linear relationship, it is less difficult to determine the control parameter. The linear relationship between given throttle amounts and different accelerations implemented by the vehicle has a piecewise attribute according to different gears of the vehicle. That is, there are at least two successively connected linear relationships corresponding to different gears, which correspond to at least two gears of the vehicle, and accelerations represented by the at least two linear relationships are positively correlated to speeds of the corresponding gears. For a specific acceleration, target gears that need to be used in sequence to implement the target acceleration need to be determined. Based on the linear relationship corresponding to the target gear, a first throttle amount required in the corresponding target gear is determined, so that the speed of the self-driving car is controlled smoothly. The power system model includes at least two interconnected linear relationships. For the same vehicle, according to different gears of the vehicle, linear relationships between throttle amounts and different accelerations that the vehicle can be driven to implement are also different. As shown in FIG. 7, when a gear value of the vehicle is 1, a linear relationship between throttle amounts and accelerations is $y1=f1(x1)$, where $x1$ represents a throttle amount, and $y1$ represents an acceleration achieved by using a given throttle amount. When a gear value is 2, $y1=f2(x1)$, where $x1$ represents a throttle amount, and $y1$ represents an acceleration achieved by using a given throttle amount. When a gear value is 3, $y1=f3(x1)$, where $x1$ represents a throttle amount, and $y1$ represents an acceleration achieved by using a given throttle amount.

Figure 8:
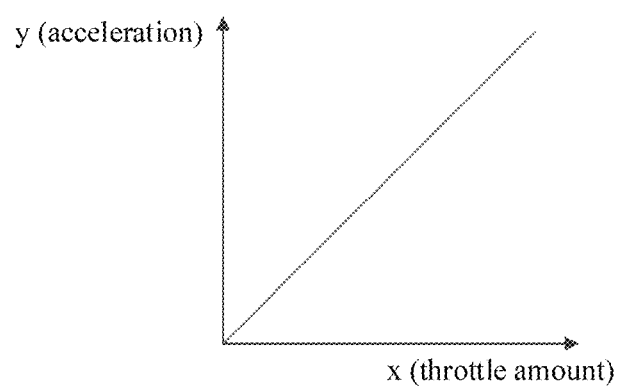
FIG. 8 is a schematic diagram of a linear relationship between throttle amounts and accelerations according to an embodiment of this application.

The linear relationship between given throttle amounts and different accelerations that the vehicle can be driven to implement is not limited to the piecewise attribute. For example, the linear relationship between throttle amounts and different accelerations that the vehicle can be driven to implement can be a continuous linear relationship. As shown in FIG. 8, the linear relationship between throttle amounts and accelerations is $y1=f4(x1)$, where $x1$ represents a throttle amount, and $y1$ represents an acceleration achieved by using a given throttle amount.

In the acceleration control mode, before the throttle amount for implementing the target driving speed is applied to the vehicle, based on a second damping factor model that represents a third linear relationship between resistances and minimum braking amounts and a resistance that the vehicle encounters during driving, a minimum braking amount for keeping a moment balance of the vehicle is determined; and the determined minimum braking amount is used as one of control parameters of the vehicle in the road section. In this embodiment of this application, the second damping factor model includes a linear relationship between resistances and minimum braking amounts for implementing a moment balance state. The resistances at least include a wind resistance and/or a road grade. The wind resistance is positively correlated to the driving speed of the vehicle, and a road down-grade is positively correlated to the braking amount, as shown in the following formula (1) and formula (2):

$$Fw=w\_gain*v*v \quad (1)$$

$$P=Km*a \quad (2)$$

where Fw represents a wind resistance; w_gain is a wind resistance coefficient; v represents a driving speed of a vehicle; P represents a road grade; Km represents a grade coefficient; a represents acceleration integration; and according to different vehicles, w_gain and Km have different values.

When the matching control mode is the acceleration control mode, in another embodiment, an implementation process for determining the braking amount of the vehicle in the road section is the same as the implementation process for determining the braking amount of the vehicle in the road section in the foregoing embodiment. The difference lies in that, after the first throttle amount is determined based on the power system model, based on a first damping factor model that represents a second linear relationship between resistance offsets of the vehicle and required throttle amounts, a second throttle amount required for offsetting a resistance during driving of the vehicle is determined. A sum of the first throttle amount and the second throttle amount is determined. The control parameter is updated by using the sum of the first throttle amount and the second throttle amount. That is, the sum of the first throttle amount and the second throttle amount is used as a throttle amount for controlling the vehicle. During an actual driving process, the vehicle inevitably encounters a driving resistance. Therefore, the resistance in the driving process is compensated for by using the second throttle amount, to avoid a delay in implementing the target driving speed when the vehicle is controlled by using the first throttle amount only, and avoid a failure in implementing the target driving speed due to a resistance factor. Resistances related to the first damping factor model at least include a wind resistance, a mechanical friction resistance, and/or a road resistance. The mechanical friction resistance is related to a gear value of the vehicle; the road resistance is related to a gear value of the vehicle, a vehicle weight, and a road grade, as shown in the following formula (3) and formula (4):

$$Ff=g\_gain/N \quad (3)$$

$$Fr=r\_gain*N*mg*P \quad (4)$$

where Ff represents a mechanical friction resistance; g_gain is a mechanical friction resistance coefficient; N represents a gear value of a vehicle; P represents a road grade; Fr represents a road resistance; r_gain is a road resistance coefficient; m represents a vehicle mass; g represents a gravitational acceleration; and according to different vehicles, r_gain and g_gain have different values.

Based on the wind resistance, the mechanical friction resistance, and the road resistance determined according to formula (1), formula (3), and formula (4), a second throttle amount is determined, as shown in the following formula (5):

$$\text{second throttle amount}=Ks*(Fw+Ff+Fr) \quad (5)$$

where the value of Ks varies according to different vehicles.

After the second throttle amount is determined, a sum of the first throttle amount and the second throttle amount is used as one of control parameters of the vehicle in the road section.

In the acceleration control mode, after the control parameter applied to the vehicle is determined, the braking amount applied in the vehicle is first reduced, until the braking amount reaches the minimum braking amount for keeping the moment balance of the vehicle. Then, the throttle amount (e.g., the first throttle amount, or the sum of the first throttle amount and the second throttle amount) required for implementing the target acceleration in the road section is applied in the vehicle, until the vehicle is accelerated to the target driving speed.

When the matching control mode is the braking control mode, in an embodiment, a target acceleration required for implementing the target driving speed in the road section where the vehicle is located is determined. Because the target driving speed is less than the actual driving speed, the target acceleration is a negative value. The target acceleration is in a direction opposite to that of the actual driving speed, and is also referred to as a deceleration. By using the determined target acceleration, it can be implemented that the actual driving speed is equal to the target driving speed when the vehicle reaches the end of the road section. By using the determined target acceleration, it is also possible to implement that the actual driving speed is equal to the target driving speed before the vehicle reaches the end of the road section, and the vehicle runs at the target driving speed constantly before reaching the end of the road section. Then, based on a braking system model that represents a fourth linear relationship between different given braking amounts of the vehicle and accelerations implemented by the vehicle, a first braking amount required for implementing the target acceleration in the road section is determined as one of control parameters.

In this embodiment of this application, a braking system model is a linear relationship between given braking amounts and different accelerations that the vehicle can be controlled to implement, where the relationship is obtained according to performance of components (including, for example, a brake pedal, a brake assist system, a brake hydraulic circuit, a brake pad, and a brake disc) of a brake system of the vehicle.

Figures 1, 9:
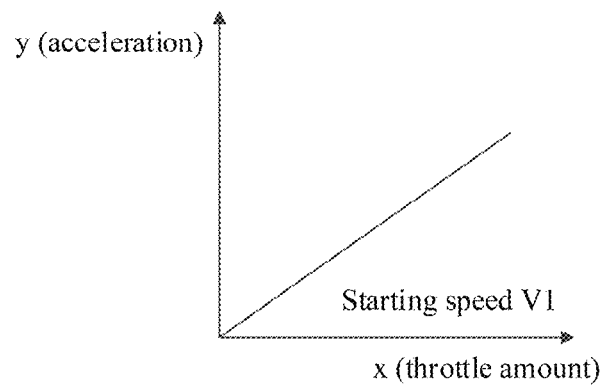
Figures 2, 9:
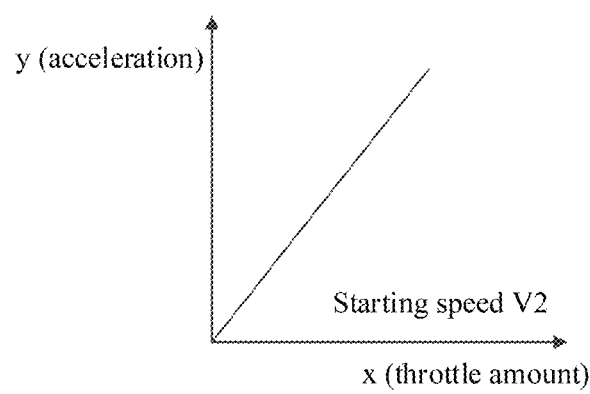

It can be appreciated that, there are multiple braking system models, and each braking system model corresponds to a starting speed. In different candidate braking system models, accelerations obtained through the same braking amount are positively correlated to starting speeds of the corresponding braking system models. A linear relationship between braking amounts and accelerations shown in FIG. 9-1 corresponds to a starting speed V1, and a linear relationship between braking amounts and accelerations shown in FIG. 9-2 corresponds to a starting speed V2, where V1 is greater than V2. With the same given braking amount, an acceleration value implemented by using the linear relationship between braking amounts and accelerations shown in FIG. 9-1 is less than an acceleration value implemented by using the linear relationship between braking amounts and accelerations shown in FIG. 9-2. Therefore, a braking system model needs to be determined from multiple candidate braking system models, so as to determine, by using the determined braking system model, a first braking amount required for implementing the target acceleration in the road section where the vehicle is located. The determined minimum braking amount is used as one of control parameters of the vehicle in the road section.

In this embodiment of this application, the actual driving speed of the vehicle may be matched with the starting speed corresponding to the candidate braking system model. In an example, when the actual driving speed is the same as the starting speed of the candidate braking system model, it is confirmed that the actual driving speed matches the starting speed corresponding to the candidate braking system model. In another example, when a difference between the actual driving speed and the starting speed of the candidate braking system model is less than a preset threshold, it is confirmed that the actual driving speed matches the starting speed corresponding to the candidate braking system model. In another example, when the actual driving speed is in a starting speed interval of the candidate braking system model, it is confirmed that the actual driving speed matches the starting speed corresponding to the candidate braking system model.

In an embodiment, the braking system model corresponding to the actual driving speed may be trained through machine training according to sample data of a vehicle of the same type. For example, braking amount data of the vehicle of the same type based on different driving speeds is used as training samples. The braking system model is trained based on the training samples and target states (e.g., accelerations) labeled by the training samples, so that the braking system model is capable of predicting a corresponding target state (e.g., acceleration) according to a training sample (e.g., braking amount).

In the braking control mode, before the braking amount for implementing the target driving speed is applied to the vehicle, to further achieve smooth control over the vehicle, a relationship between resistances and minimum throttle amounts required for keeping idling may be fit into a linear relationship. Based on a fourth damping factor model that represents a sixth linear relationship between resistances and minimum throttle amounts required for keeping the vehicle idling, a minimum throttle amount required for keeping the vehicle idling is determined according to a resistance of the vehicle during actual driving. The determined minimum throttle amount is used as one of control parameters of the vehicle in the road section. In this embodiment of this application, the resistances at least include a wind resistance and/or a road grade. The wind resistance is positively correlated to a driving speed of the vehicle, and a road down-grade is positively correlated to a braking amount, as shown in the foregoing formula (1) and formula (2).

When the matching control mode is the braking control mode, in another embodiment, an implementation process for determining the throttle amount of the vehicle in the road section is the same as the implementation process for determining the throttle amount of the vehicle in the road section in the foregoing embodiment. The difference lies in that, after the first braking amount is determined based on the braking system model, based on a third damping factor model that represents a fifth linear relationship between resistances and braking amounts equivalent to the resistances, a second braking amount equivalent to a resistance that the vehicle encounters during driving and required for controlling the vehicle to keep the target driving speed is determined. The control parameter is updated based on a difference between the first braking amount and the second braking amount. Resistances related to the third damping factor model at least include a wind resistance, a mechanical friction resistance, and a road resistance. The mechanical friction resistance is related to a gear value of the vehicle; the road resistance is related to a gear value of the vehicle, a vehicle weight, and a road grade, as shown in the foregoing formula (3) and formula (4).

Based on the wind resistance, the mechanical friction resistance, and the road resistance determined according to formula (1), formula (3), and formula (4), a second braking amount is determined, as shown in the following formula (6):

$$\text{second braking amount} = Bs^*(Fw+Ff+Fr) \quad (6)$$

where the value of Bs varies according to different vehicles.

After the second braking amount is determined, after a difference between the first braking amount and the second braking amount is used as one of control parameters of the vehicle in the road section. In this way, after the first braking amount is determined, the second braking amount equivalent to the resistance that the vehicle encounters during driving is eliminated from the first braking amount, to further ensure the accuracy of deceleration.

In the braking control mode, first, a throttle amount applied in the vehicle is reduced to the minimum throttle amount for keeping the vehicle decelerating. Then, a braking amount required for implementing the target acceleration in the road section is applied in the vehicle, until the vehicle is decelerated to the target driving speed. The required braking amount is the first braking amount required for implementing the target acceleration in the road section, or a difference between the first braking amount required for implementing the target acceleration in the road section and the second braking amount equivalent to the resistance that the vehicle encounters during driving and required for implementing the target driving speed.

Factors with small impact are ignored in the first resistance factor model, the second resistance factor model, the third resistance factor model, and the fourth resistance factor model proposed in this embodiment of this application, and the wind resistance, mechanical friction resistance, and road resistance with large impact are reserved. Moreover, the wind resistance, the mechanical friction resistance, and the road resistance are fit into functions related to parameters that can be measured easily, for example, speed and time, thus avoiding dependency on expensive inertia elements with complex structures in the related technology, and improving the universality, implementability, and transportability of a self-driving car. In this embodiment of this application, in the braking control mode and the acceleration control mode, the braking system model and the power system model that are applied so as to control the self-driving car both control the self-driving car based on both the throttle amount and the braking amount, thus avoiding vehicle vibrations (e.g., sudden braking or fierce braking) due to frequent switching between the brake and the throttle, and improving smoothness of speed control.

When the matching control mode is the stopping control mode, a target acceleration required for implementing zero speed in the road section where the vehicle is located is determined. Based on a braking system model that represents a linear relationship between given braking amounts of the vehicle and accelerations implemented by the vehicle, a braking amount required for implementing the zero speed in the road section where the vehicle is located is determined. A braking amount for keeping a stopping state at the zero speed is determined. In an embodiment, a specific implementation process for determining the target acceleration and the braking amount is the same as the specific implementation process for determining the target acceleration and the first braking amount in the braking control mode. The difference lies in that, the determined braking amount for keeping the stopping state at the zero speed may be a maximum braking amount that the vehicle can implement, or a predetermined ratio less than the maximum braking amount (e.g., 80% of the maximum braking amount).

In this embodiment of this application, in the stopping control mode, the self-driving car is controlled by using the braking system model, so that the target speed of the self-driving car is zero, thus greatly improving the smoothness of speed control. After the speed of the vehicle becomes zero, the vehicle is controlled by using a braking amount exceeding a particular threshold, so as to keep the stopping state and prevent the vehicle from slipping.

In this embodiment of this application, in each control mode, the throttle amount and the braking amount are calculated by using separate algorithms. Compared with the related technology in which the throttle amount and the braking amount are calculated by using the same algorithm merely according to a difference between the current driving speed and the target driving speed, subdivision of algorithms further ensures the smooth control over the vehicle speed.

It is proposed in this embodiment of this application that, the vehicle control method is implemented by using vehicle control models. The vehicle control models include: a power system model, a braking system model, a stopping system model, a first damping factor model, a second damping factor model, a third damping factor model, and a fourth damping factor model. The method is implemented without relying on an ESP system. Therefore, during vehicle control in this embodiment of this application, the vehicle does not need to be configured with devices such as a steering sensor, a wheel sensor, a sideslip sensor, and a transverse acceleration sensor required by the ESP system. Compared with the vehicle control method in the related technology, the vehicle control method in this embodiment of this application has lower implementation costs and better transportability.

In step S104, the determined throttle amount and braking amount is applied in the vehicle based on a throttle amount and braking amount application manner corresponding to the determined control mode.

Figure 10:
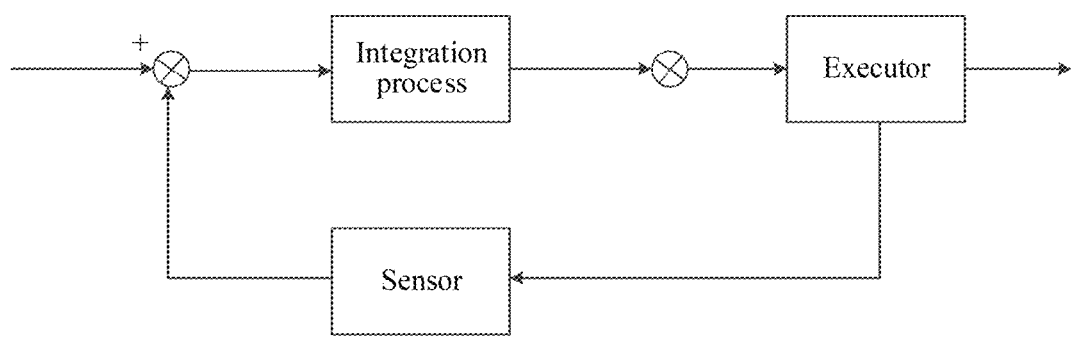
FIG. 10 is a schematic diagram of updating a control parameter according to an embodiment of this application.

In this embodiment of this application, integration is performed on a difference between an actual acceleration, which is obtained by applying the control parameter determined in step S103 to the vehicle, and a target acceleration that needs to be obtained according to the power control mode, the braking control mode, or the stopping control mode, to obtain a corrected value of the control parameter applied to the vehicle. The control parameter applied to the vehicle is updated based on the corrected value. As shown in FIG. 10, after a sensor acquires the actual acceleration of the vehicle, a difference between the actual acceleration and the target acceleration is calculated, and the difference is integrated by using an integrator, to obtain a corrected value of the control parameter applied to the vehicle. An executor updates, based on the corrected value, the control parameter applied to the vehicle. The corrected value of the control parameter applied to the vehicle is obtained according to the following formula (7):

$$u(x) = K_p \left( e(t) + \frac{1}{T_i} \int_0^t e(t) \, dt + T_d \frac{de(t)}{dt} \right) \quad (7)$$

where e(t) represents an acceleration error; Ti represents an integration time; Kp represents a ratio coefficient; u(x) represents a corrected value of a control parameter applied to a vehicle; the acceleration error can be corrected quickly based on the foregoing method, thus achieving the objective of converging to the target acceleration.

When the control mode of the vehicle is the acceleration control mode, the braking amount applied in the vehicle is reduced based on a predetermined amplitude. When the applied braking amount is reduced to a minimum braking amount for keeping a moment balance of the vehicle, a throttle amount (e.g., the first throttle amount, or the sum of the first throttle amount and the second throttle amount) required for implementing a target acceleration corresponding to the control mode is applied in the vehicle, until the speed is increased to the target driving speed.

When the control mode of the vehicle is the braking control mode, the throttle amount applied in the vehicle is reduced based on a predetermined amplitude. When the applied throttle amount is reduced to a minimum throttle amount for keeping the vehicle idling, a braking amount (e.g., the first braking amount, or the difference between the first braking amount and the second braking amount) required for reaching a target acceleration corresponding to the control mode is applied in the vehicle until the speed is reduced to the target driving speed.

When the control mode of the vehicle is the stopping control mode, a braking amount required for reaching a target acceleration corresponding to the control mode is applied in the vehicle, so that the vehicle is decelerated to the zero speed. When the speed is reduced to zero, a braking amount required for keeping a stopping state is applied in the vehicle, so that the vehicle keeps the stopping state, and the vehicle is prevented from slipping.

This embodiment of this application has the following beneficial effects:

In the first aspect, the acceleration control mode and the braking control mode included in the control modes both control the vehicle with reference to two control factors: the throttle amount and the braking amount. Compared with the related technology in which the vehicle is controlled by using the throttle amount or the braking amount alone, this embodiment avoids vehicle vibrations generated due to frequent switching between the brake and the throttle, and improves the smoothness of speed control.

In the second aspect, the vehicle control method provided in this embodiment of this application is implemented without relying on the ESP system. The vehicle does not need to be configured with devices such as the steering sensor, the wheel sensor, the sideslip sensor, and the transverse acceleration sensor required by the ESP system. Compared with the vehicle control method in the related technology, the vehicle control method in this embodiment has lower implementation costs and better transportability.

In the third aspect, the control mode of the vehicle can be determined quickly by comparing the target driving speed with the actual driving speed. Compared with the related technology in which the vehicle control mode is determined comprehensively according to the throttle control amount, the brake control amount, and the speed difference, the implementation process in this embodiment is simpler.

In the fourth aspect, in each control mode in this embodiment of this application, the throttle amount and the braking amount are calculated by using separate algorithms. Compared with the related technology in which the throttle amount and the braking amount are calculated by using the same algorithm merely according to a difference between the current driving speed and the target driving speed, subdivision of algorithms further ensures the smooth control over the vehicle speed.

Figure 11:
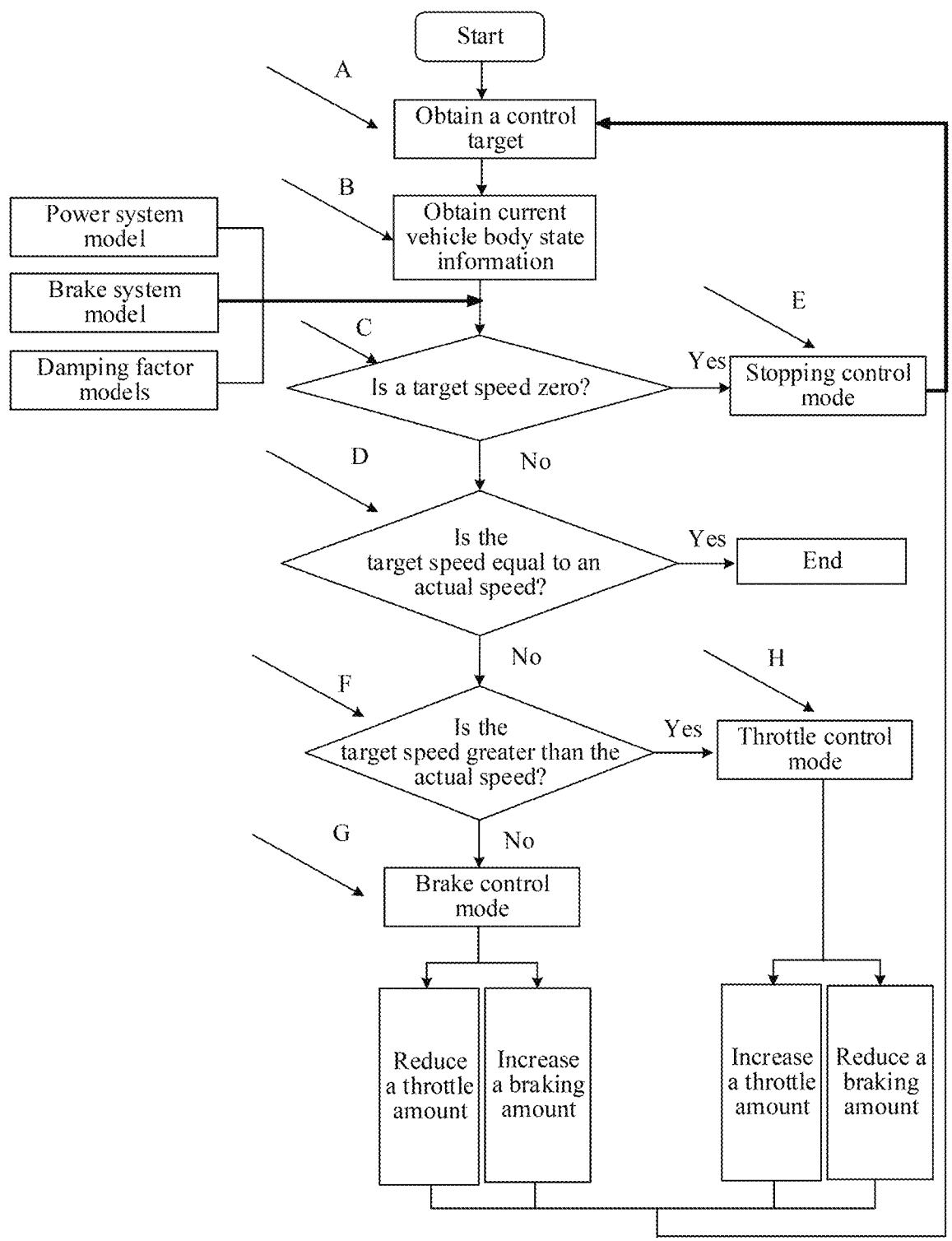
FIG. 11 is a schematic flowchart of a vehicle control method according to an embodiment of this application.
Figure 12:
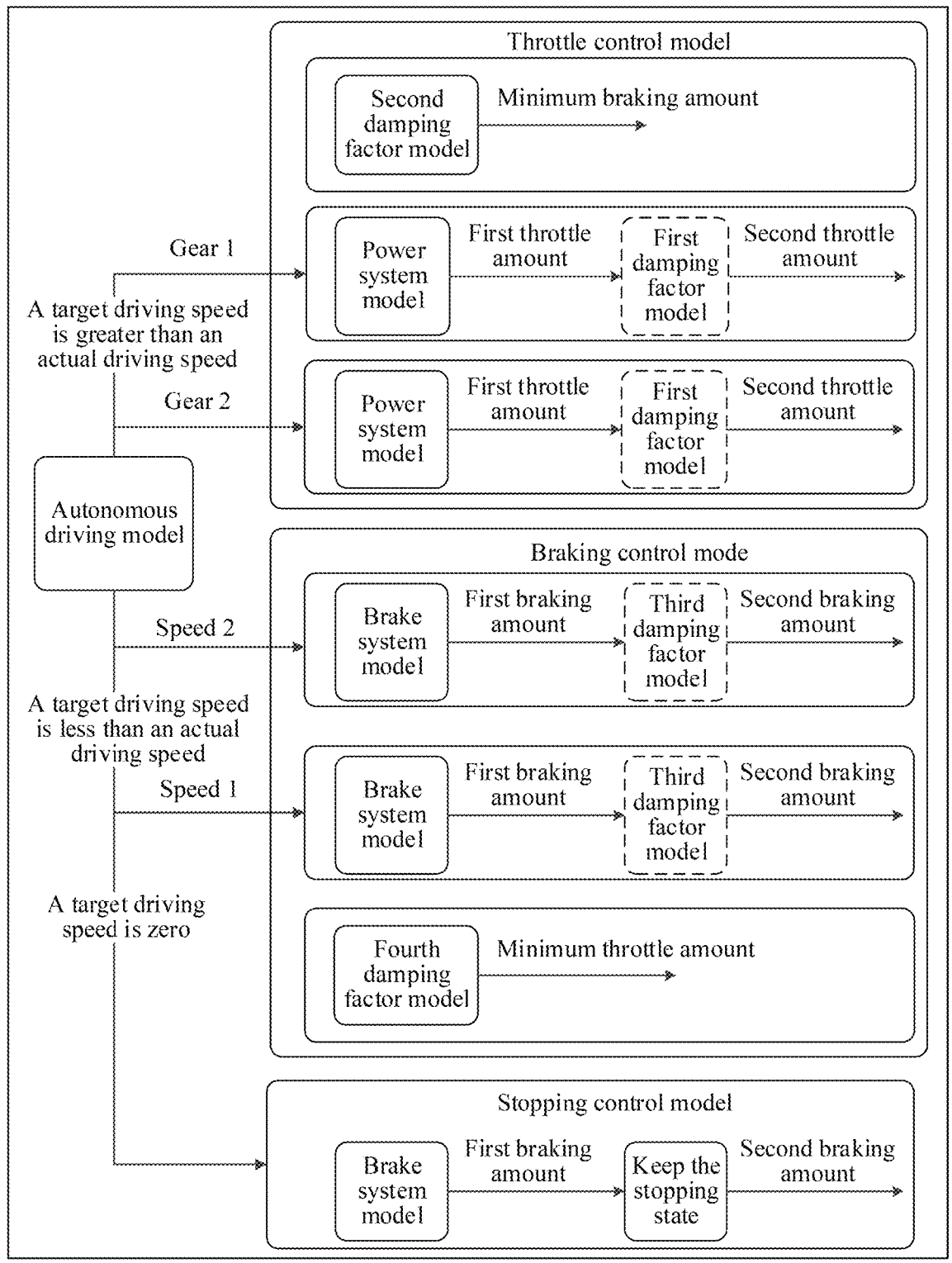
FIG. 12 is a schematic diagram of application of a vehicle control model according to an embodiment of this application.

FIG. 11 is another schematic flowchart of a vehicle control method according to an embodiment of this application. With reference to the schematic diagram of application of a vehicle control model shown in FIG. 12, steps are described separately.

In step A, target speed information is obtained in a bus.

In step B, vehicle body state information acquired by a vehicle body sensor is filtered and then the filtered information is returned to a controller of a vehicle.

The vehicle body state information acquired by the vehicle body sensor includes, for example, a speed, acceleration, a vehicle body posture, and/or other information. Filtering refers to removing obvious incorrect data such as noise.

Herein, the power system model, the braking system model, and the damping factor models are applied to the controller and are integrated with the vehicle body state information, to form a complete vehicle control model.

In step C, a stopping mode class is determined. For example, a determination is made as to whether it is a stopping control mode or a running control mode.

The running control mode includes: a braking control mode and an acceleration control mode.

In step D, a determination is made as to whether a vehicle control result reaches an expectation. If yes, the current vehicle control process is ended. Otherwise, step F is performed.

In step E, the stopping control mode is entered. Based on the stopping control mode, a comfortable deceleration manner is used according to a current vehicle status, until the speed is reduced to 0. Then a stopping state is locked according to a current road condition, to prevent slipping.

A braking amount for keeping the stopping state locked is a maximum braking amount that the vehicle can implement, or a predetermined ratio of braking amount less than the maximum braking amount that the vehicle can implement.

In step F, a target driving speed is compared with an actual driving speed. If the target driving speed is greater than the actual driving speed, step G is performed. If the target driving speed is less than the actual driving speed, step H is performed.

In step G, the vehicle is controlled by using the braking control mode.

In the braking control mode, a minimum throttle amount for keeping a moment balance of the vehicle is determined first. The minimum throttle amount may be determined based on a fourth damping factor model that represents a sixth linear relationship between resistances and minimum throttle amounts. Then, based on a braking system model that represents a fourth linear relationship between given braking amounts of the vehicle and accelerations implemented by the vehicle, a first braking amount required for implementing a target acceleration in a road section where the vehicle is located is determined. The first braking amount and the minimum throttle amount are used as control parameters. Alternatively, based on a third damping factor model that represents a fifth linear relationship between resistances and braking amounts, a second braking amount required for controlling the vehicle to keep the target driving speed is determined. A sum of the first throttle amount and the second throttle amount, and the minimum braking amount are used as updated control parameters. A difference between the first braking amount and the second braking amount, and the minimum throttle amount are used as updated control parameters. In this process, the actual vehicle speed is converged to the target vehicle speed at an integration rate, thus achieving the objective of quickly tracking the target vehicle speed.

In step H, the vehicle is controlled by using the acceleration control mode.

In the acceleration control mode, a minimum braking amount for keeping a moment balance of the vehicle is determined first. The minimum braking amount may be determined based on a second damping factor model that represents a third linear relationship between resistances and minimum braking amounts. Then, based on a power system model that represents a first linear relationship between given throttle amounts of the vehicle and accelerations implemented by the vehicle, a first throttle amount required for implementing a target acceleration in a road section where the vehicle is located is determined. The first throttle amount and the minimum braking amount are used as control parameters. Alternatively, based on a second damping factor model that represents a second linear relationship between resistances and throttle amounts, a second throttle amount required for controlling the vehicle to keep the target driving speed is determined. A sum of the first throttle amount and the second throttle amount, and the minimum braking amount are used as updated control parameters. In this process, the actual vehicle speed is converged to the target vehicle speed at an integration rate, thus achieving the objective of quickly tracking the target vehicle speed.

Figure 13:
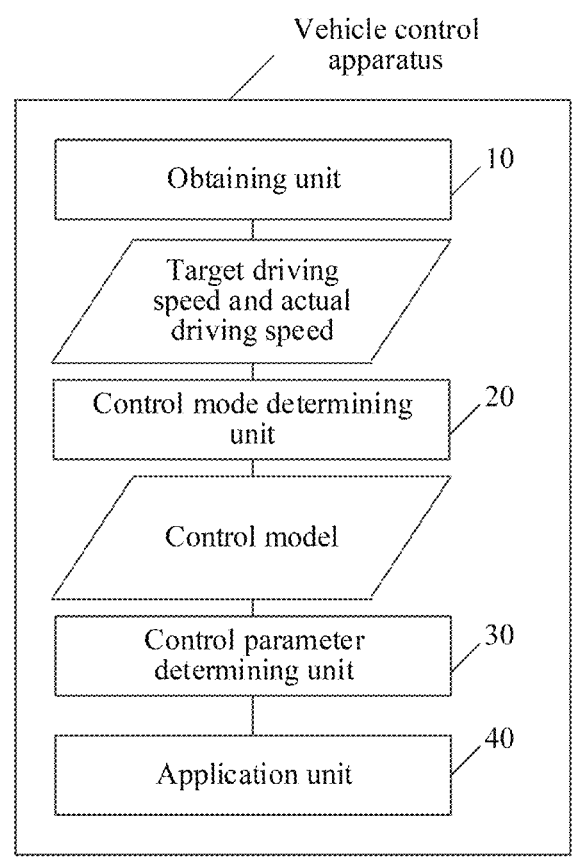
FIG. 13 is a compositional schematic structural diagram of a vehicle control apparatus according to an embodiment of this application.

Based on the foregoing description, it is to be appreciated that as shown in FIG. 13, a composition structure of a vehicle control apparatus for implementing the vehicle control method may include the following functional units:

Functions of the units are described in the following and can be implemented by circuitry (e.g., processing circuitry) in some embodiments.

An obtaining unit 10 is configured to obtain a target driving speed and an actual driving speed of a vehicle in a road section where the vehicle is located.

A control mode determining unit 20 is configured to determine, based on a comparison result of the target driving speed and the actual driving speed, a control mode corresponding to the comparison result among candidate control modes, the candidate control modes including: a braking control mode, an acceleration control mode, and a stopping control mode.

A control parameter determining unit 30 is configured to determine, based on a throttle amount and braking amount determining manner corresponding to the determined control mode, a throttle amount and a braking amount required for implementing the target driving speed in the road section where the vehicle is located.

An application unit 40 is configured to apply the determined throttle amount and braking amount in the vehicle based on a throttle amount and braking amount application manner corresponding to the determined control mode.

In an embodiment, the obtaining unit 10 is specifically configured to apply a speed-time curve to a road section from an actual location of the vehicle to a target location, to obtain time and speeds corresponding to arrival at different front locations in the road section; and determine a speed corresponding to a front location adjacent to the actual location of the vehicle as the target driving speed.

In an embodiment, the application unit 40 is specifically configured to reduce, based on a predetermined amplitude, the braking amount applied in the vehicle, in a case that the control mode is the acceleration control mode; and apply a throttle amount required for implementing a target acceleration corresponding to the control mode in the vehicle until the speed is increased to the target driving speed, in a case that the applied braking amount is reduced to a minimum braking amount for keeping a moment balance of the vehicle.

In an embodiment, the application unit 40 is specifically configured to reduce, based on a predetermined amplitude, the throttle amount applied in the vehicle, in a case that the control mode is the braking control mode; and apply a braking amount required for reaching a target acceleration corresponding to the control mode in the vehicle until the speed is reduced to the target driving speed, in a case that the applied throttle amount is reduced to a minimum throttle amount for keeping the vehicle idling.

In an embodiment, the application unit 40 is specifically configured to apply a braking amount required for reaching a target acceleration corresponding to the control mode in the vehicle, in a case that the control mode is the stopping control mode; and apply a braking amount required for keeping a stopping state in the vehicle, in a case that the speed is reduced to zero.

In an embodiment, the application unit 40 is specifically configured to apply, to the vehicle, a control parameter to be applied to the vehicle, to obtain an actual acceleration, and integrate a difference between the actual acceleration and a target acceleration obtained according to the control mode, to obtain a corrected value of the control parameter applied to the vehicle; and update, based on the corrected value, the control parameter applied to the vehicle;

where the control parameter is a throttle amount or a braking amount.

In an embodiment, the control parameter determining unit 30 is specifically configured to determine a target acceleration required for implementing the target driving speed in a road section where the vehicle is located, in a case that the control mode is the acceleration control mode;

determine, based on a first linear relationship between throttle amounts and accelerations of the vehicle, a first throttle amount required for implementing the target acceleration in the road section where the vehicle is located;

determine, based on a second linear relationship between resistance offsets of the vehicle and required throttle amounts, a second throttle amount required for offsetting a resistance during driving of the vehicle; and determine a sum of the first throttle amount and the second throttle amount, and use the sum of the first throttle amount and the second throttle amount as the throttle amount required for implementing the target driving speed.

In an embodiment, the control parameter determining unit 30 is specifically configured to, where the first linear relationship includes at least two successively connected linear relationships corresponding to different gears of the vehicle:

determine target gears that need to be used in sequence to implement the target acceleration; and determine, based on linear relationships in the first linear relationship that correspond to the target gears, first throttle amounts required in the corresponding target gears.

In an embodiment, the control parameter determining unit 30 is specifically configured to determine, based on a third linear relationship between resistances and minimum braking amounts required for implementing a moment balance state as well as a resistance that the vehicle encounters during driving, a minimum braking amount for keeping the moment balance of the vehicle, and use the minimum braking amount as the braking amount required for implementing the target driving speed, in a case that the control mode is the acceleration control mode.

In an embodiment, the control parameter determining unit 30 is specifically configured to determine a target acceleration required for implementing the target driving speed in a road section where the vehicle is located, in a case that the control mode is the braking control mode;

determine, based on a fourth linear relationship between braking amounts and accelerations of the vehicle, a first braking amount required for implementing the target acceleration in the road section where the vehicle is located;

determine, based on a fifth linear relationship between resistances and braking amounts equivalent to the resistances, a second braking amount required for the target driving speed equivalent to a resistance that the vehicle encounters during driving; and determine a difference between the first braking amount and the second braking amount, and use the difference between the first braking amount and the second braking amount as the braking amount required for implementing the target driving speed.

In an embodiment, among the candidate fourth linear relationships, a fourth linear relationship in which a starting speed matches the actual driving speed of the vehicle is determined, where in different candidate fourth linear relationships, accelerations obtained through the same braking amount are positively correlated to starting speeds of the corresponding fourth linear relationships.

In an embodiment, the control parameter determining unit 30 is specifically configured to determine, based on a sixth linear relationship between resistances and minimum throttle amounts required for keeping idling as well as a resistance that the driver encounters during driving, a minimum throttle amount required for keeping the vehicle idling, and use the minimum throttle amount as the throttle amount required for implementing the target driving speed, in a case that the control mode is the braking control mode.

An embodiment of this application further provides a vehicle, including:

a memory, configured to store an executable program; and a processor, configured to implement the foregoing vehicle control method in the embodiments of this application by performing the executable program stored in the memory.

An embodiment of this application further provides a storage medium storing an executable program. The executable program, when executed by a processor, performs the following operations:

obtaining a target driving speed and an actual driving speed of a vehicle; determining, based on a comparison result of the target driving speed and the actual driving speed, a control mode corresponding to the comparison result among candidate control modes, the candidate control modes including: a braking control mode, an acceleration control mode, and a stopping control mode; determining, based on a throttle amount and braking amount determining manner corresponding to the determined control mode, a throttle amount and a braking amount required for implementing the target driving speed; and applying the determined throttle amount and braking amount in the vehicle based on a throttle amount and braking amount application manner corresponding to the determined control mode.

In conclusion, the embodiments of this application can have the following technical effects:

Multiple vehicle control models are proposed, including a power system model, a braking system model, a stopping system model, a first resistance factor model, a second resistance factor model, a third resistance factor model, and a fourth resistance factor model, which are used for determining control parameters of a self-driving car and can achieve the following advantages:

1) In both power system model and braking system model, two control parameters, that is, the throttle amount and the braking amount, can be determined based on the target driving speed and the actual driving speed. The self-driving car is controlled based on both the throttle amount and the braking amount, thus avoiding vehicle vibrations (e.g., sudden braking or fierce braking) due to frequent switching between the brake and the throttle, and improving smoothness of speed control.

2) The stopping mode is used as a mode different from normal driving, and the self-driving car is controlled based on the braking system model, so that the target speed of the self-driving car is zero, thus greatly improving the smoothness of speed control.

3) After the control parameter for implementing the target driving speed in the road section where the vehicle is located is determined based on the control mode matching the target driving speed and the actual driving speed, the control parameter is applied to the vehicle, to obtain an actual acceleration. A difference between the actual acceleration and the target acceleration that needs to be obtained in the control mode is integrated, to obtain a corrected value of the control parameter applied to the vehicle. The control parameter applied to the vehicle is updated based on the corrected value, thus quickly correcting the acceleration. For example, converging the acceleration to the target acceleration.

4) Control over the self-driving car is implemented through the proposed vehicle control model without relying on the ESP system. Therefore, during control over the self-driving car in the embodiments of this application, the vehicle does not need to be configured with devices such as a steering sensor, a wheel sensor, a sideslip sensor, and a transverse acceleration sensor required by the ESP system. Compared with the vehicle control method in the related technology, the vehicle control method in the embodiments of this application has lower implementation costs and better transportability.

5) In the power system model, a nonlinear relationship between various components (including, for example, an internal combustion engine, a clutch, a gearbox, a differential, a throttle valve, and a throttle opening) in the power system of the self-driving car is simplified to be a linear relationship, so that it is less difficult to determine the control parameter.

6) Factors with small impact are ignored in the first resistance factor model, the second resistance factor model, the third resistance factor model, and the fourth resistance factor model, and the wind resistance, mechanical friction resistance, and road resistance with large impact are reserved. Moreover, the wind resistance, the mechanical friction resistance, and the road resistance are fit into functions related to parameters that can be measured easily, for example, speed and time, thus avoiding dependency on expensive inertia elements with complex structures in the related technology, and improving the universality, implementability, and transportability of the self-driving car.

7) When the acceleration control mode is applied in the vehicle during driving, the vehicle inevitably encounters a driving resistance. In the embodiments of this application, the resistance in the driving process is compensated for by using the second throttle amount, to avoid a delay in implementing the target driving speed when the vehicle is controlled by using the first throttle amount only, and avoid a failure in implementing the target driving speed due to a resistance factor.

8) When the braking control mode is applied in the vehicle during driving, after the first braking amount is determined, the second braking amount equivalent to the resistance that the vehicle encounters during driving is eliminated from the first braking amount, to further ensure the accuracy of deceleration.

9) The control mode of the vehicle can be determined quickly by comparing the target driving speed with the actual driving speed. Compared with the related technology in which the vehicle control mode is determined comprehensively according to the throttle control amount, the brake control amount, and the speed difference, the implementation process in this application is simpler.

10) In the embodiments of this application, in each control mode, the throttle amount and the braking amount are calculated by using separate algorithms. Compared with the related technology in which the throttle amount and the braking amount are calculated by using the same algorithm merely according to a difference between the current driving speed and the target driving speed, subdivision of algorithms further ensures the smooth control over the vehicle speed.

The foregoing descriptions are merely exemplary implementation modes of this application, but the protection scope of this application is not limited thereto. Variations and/or modifications within the technical scope disclosed in this application shall fall within the protection scope of this application. Therefore, the protection scope of this application shall be subject to the protection scope of the claims.

What is claimed is:

1. A vehicle control method, comprising:
    obtaining, by processing circuitry, a target driving speed and an actual driving speed of the vehicle;
    determining, by the processing circuitry and based on a comparison between the target driving speed and the actual driving speed, a control mode among candidate control modes, the candidate control modes including a braking control mode, an acceleration control mode, and a stopping control mode;
    determining, by the processing circuitry, a throttle amount and a braking amount to change the actual driving speed to the target driving speed; and
    applying, by the processing circuitry, the determined throttle amount and braking amount to the vehicle based on the determined control mode.

2. The method according to claim 1, wherein the obtaining comprises:
    applying a speed-time curve to a road section from an actual location of the vehicle to a target location, to obtain time and speeds corresponding to arrival at different locations in the road section that are in front of the vehicle; and
    determining a speed corresponding to a front location of the different locations that is adjacent to the actual location as the target driving speed.

3. The method according to claim 1, wherein the applying comprises:
    reducing, based on a predetermined amplitude, the braking amount applied to the vehicle, in a case that the control mode is the acceleration control mode; and
    applying the throttle amount for a target acceleration corresponding to the control mode in the vehicle until the actual driving speed is increased to the target driving speed, in a case that the applied braking amount is reduced to a minimum braking amount.

4. The method according to claim 1, wherein the applying comprises:
reducing, based on a predetermined amplitude, the throttle amount applied to the vehicle, in a case that the control mode is the braking control mode; and
applying the braking amount for a target deceleration corresponding to the control mode in the vehicle until the actual driving speed is reduced to the target driving speed, in a case that the applied throttle amount is reduced to a minimum throttle amount.

5. The method according to claim 1, wherein the applying comprises:
applying a first braking amount for a target deceleration corresponding to the control mode in the vehicle, in a case that the control mode is the stopping control mode; and
applying a second braking amount for maintaining the vehicle in a stopping state, in a case that the speed is reduced to zero.

6. The method according to claim 1, wherein the applying comprises:
applying, to the vehicle, a control parameter to be applied to the vehicle, to obtain an actual acceleration, and integrating a difference between the actual acceleration and a target acceleration obtained according to the control mode, to obtain a corrected value of the control parameter applied to the vehicle; and
updating, based on the corrected value, the control parameter applied to the vehicle, the control parameter being an updated throttle amount or an updated braking amount.

7. The method according to claim 1, wherein the determining the throttle amount comprises:
determining a target acceleration to reach the target driving speed in a road section where the vehicle is located, in a case that the control mode is the acceleration control mode;
determining, based on a first linear relationship between throttle amounts and accelerations of the vehicle, a first throttle amount for the target acceleration in the road section where the vehicle is located;
determining, based on a second linear relationship between resistance offsets of the vehicle and required throttle amounts, a second throttle amount for offsetting a resistance during movement of the vehicle; and
determining a sum of the first throttle amount and the second throttle amount as the throttle amount.

8. The method according to claim 7, wherein
the first linear relationship includes at least two successively connected linear relationships corresponding to different gears of the vehicle; and
the determining the first throttle amount includes
determining target gears to be used in sequence to implement the target acceleration, and
determining, based on the linear relationships in the first linear relationship that correspond to the target gears, the first throttle amount for each of the target gears.

9. The method according to claim 1, wherein
the determining the braking amount includes determining, based on a third linear relationship between resistances and minimum braking amounts required for a moment balance state as well as a resistance that the vehicle encounters during driving, a minimum braking amount to maintain the moment balance of the vehicle; and
the braking amount is determined to be equal to the minimum braking amount in a case that the control mode is the acceleration control mode.

10. The method according to claim 1, wherein the determining the braking amount comprises:
determining a target deceleration to reach the target driving speed in a road section where the vehicle is located, in a case that the control mode is the braking control mode;
determining, based on a fourth linear relationship between braking amounts and accelerations of the vehicle, a first braking amount required for the target deceleration in the road section where the vehicle is located;
determining, based on a fifth linear relationship between resistances and braking amounts equivalent to the resistances, a second braking amount equivalent to a resistance that the vehicle encounters during driving; and
determining a difference between the first braking amount and the second braking amount as the braking amount.

11. The method according to claim 10, further comprising:
determining, by the processing circuitry and among candidate fourth linear relationships, a fourth linear relationship in which a starting speed matches the actual driving speed of the vehicle, wherein
each of the candidate fourth linear relationships corresponds to a different starting speed, and decelerations obtained through the same braking amount are correlated to the different starting speeds of the corresponding fourth linear relationships.

12. The method according to claim 1, wherein the determining the throttle amount comprises:
determining, based on a sixth linear relationship between resistances and minimum throttle amounts required for maintaining idling as well as a resistance encountered during driving, a minimum throttle amount to maintain the vehicle idling, and the minimum throttle amount as the throttle amount in a case that the control mode is the braking control mode.

13. A vehicle control apparatus, comprising:
processing circuitry configured to
obtain a target driving speed and an actual driving speed of the vehicle;
determine, based on a comparison between the target driving speed and the actual driving speed, a control mode among candidate control modes, the candidate control modes including a braking control mode, an acceleration control mode, and a stopping control mode;
determine a throttle amount and a braking amount required to change the actual driving speed to the target driving speed; and
apply the determined throttle amount and braking amount to the vehicle based on the determined control mode.

14. The vehicle control apparatus according to claim 13, wherein the processing circuitry is configured to
apply a speed-time curve to a road section from an actual location of the vehicle to a target location, to obtain time and speeds corresponding to arrival at different locations in the road section that are in front of the vehicle; and
determine a speed corresponding to a front location of the different locations that is adjacent to the actual location as the target driving speed.

15. The vehicle control apparatus according to claim 13, wherein the processing circuitry is configured to
reduce, based on a predetermined amplitude, the braking amount applied to the vehicle, in a case that the control mode is the acceleration control mode; and
apply the throttle amount for a target acceleration corresponding to the control mode in the vehicle until the actual driving speed is increased to the target driving speed, in a case that the applied braking amount is reduced to a minimum braking amount.

16. The vehicle control apparatus according to claim 13, wherein the processing circuitry is configured to
reduce, based on a predetermined amplitude, the throttle amount applied to the vehicle, in a case that the control mode is the braking control mode; and
apply the braking amount for a target deceleration corresponding to the control mode in the vehicle until the actual driving speed is reduced to the target driving speed, in a case that the applied throttle amount is reduced to a minimum throttle amount.

17. The vehicle control apparatus according to claim 13, wherein the processing circuitry is configured to
apply a first braking amount for a target deceleration corresponding to the control mode in the vehicle, in a case that the control mode is the stopping control mode; and
apply a second braking amount for maintaining the vehicle in a stopping state, in a case that the speed is reduced to zero.

18. The vehicle control apparatus according to claim 13, wherein the processing circuitry is configured to
apply, to the vehicle, a control parameter to be applied to the vehicle, to obtain an actual acceleration, and integrate a difference between the actual acceleration and a target acceleration obtained according to the control mode, to obtain a corrected value of the control parameter applied to the vehicle; and
update, based on the corrected value, the control parameter applied to the vehicle, the control parameter being an updated throttle amount or an updated braking amount.

19. The vehicle control apparatus according to claim 13, wherein the processing circuitry is configured to
determine a target acceleration to reach the target driving speed in a road section where the vehicle is located, in a case that the control mode is the acceleration control mode;
determine, based on a first linear relationship between throttle amounts and accelerations of the vehicle, a first throttle amount for the target acceleration in the road section where the vehicle is located;
determine, based on a second linear relationship between resistance offsets of the vehicle and required throttle amounts, a second throttle amount for offsetting a resistance during movement of the vehicle; and
determining a sum of the first throttle amount and the second throttle amount as the throttle amount.

20. A non-transitory computer-readable storage medium storing instructions which when executed by a processor cause the processor to perform:
obtaining a target driving speed and an actual driving speed of the vehicle;
determining based on a comparison between the target driving speed and the actual driving speed, a control mode among candidate control modes, the candidate control modes including a braking control mode, an acceleration control mode, and a stopping control mode;
determining a throttle amount and a braking amount to change the actual driving speed to the target driving speed; and
applying the determined throttle amount and braking amount to the vehicle based on the determined control mode.

* * * * *